US010772023B2

(12) United States Patent
Kapoulas et al.

(10) Patent No.: US 10,772,023 B2
(45) Date of Patent: Sep. 8, 2020

(54) MANAGEMENT OF MOBILITY TRAFFIC FLOWS IN MOBILE CELLULAR NETWORKS

(71) Applicant: AT&T MOBILITY II LLC, Atlanta, GA (US)

(72) Inventors: Spyridon Kapoulas, New York, NY (US); David Ross Beppler, Duluth, GA (US); Thomas W. Henderson, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 513 days.

(21) Appl. No.: 15/098,762

(22) Filed: Apr. 14, 2016

(65) Prior Publication Data

US 2017/0303180 A1    Oct. 19, 2017

(51) Int. Cl.
*H04W 36/30* (2009.01)
*H04W 36/08* (2009.01)
(Continued)

(52) U.S. Cl.
CPC ....... *H04W 36/30* (2013.01); *H04W 36/0094* (2013.01); *H04W 36/08* (2013.01); *H04W 16/08* (2013.01); *H04W 36/0055* (2013.01)

(58) Field of Classification Search
CPC . H04W 36/08; H04W 36/30; H04W 36/0066; H04W 24/02; H04W 36/0083;
(Continued)

(56) References Cited

U.S. PATENT DOCUMENTS 5,530,917 A    6/1996   Andersson et al.
6,141,565 A    10/2000   Feuerstein et al.
(Continued)

FOREIGN PATENT DOCUMENTS

WO   WO2012150986   11/2012
WO   WO2013156067   10/2013
(Continued)

OTHER PUBLICATIONS

"Reverb InteliSON: Advanced, automatic self-optimizing network functionality in a reliable, robust, real-time production platform.", Reverb, reverbnetworks.com, Aug. 5, 2014., 2014.
(Continued)

*Primary Examiner* — Oussama Roudani
(74) *Attorney, Agent, or Firm* — Guntin & Gust, PLC; Jay Anderson

(57) ABSTRACT

Aspects of the subject disclosure may include, for example, detecting a triggering event based on a monitoring of utilization of a target cell within a cellular network system. A configuration policy including a handover configuration parameter set is determined, responsive to the triggering event. A target cell of a plurality of neighboring cells of the source cell is identified and a handover procedure of a user equipment from the source cell to the target cell is configured based on the handover configuration parameter set. The source cell provides the handover configuration parameter set to the user equipment connected to the source cell. The user equipment, while connected to the source cell, performs handover measurements from the source cell to the target cell based on the handover configuration parameter set, and a handover of the user equipment from the source cell to the target cell is based on the handover measurements. Other embodiments are disclosed.

20 Claims, 11 Drawing Sheets

(51) Int. Cl.
*H04W 36/00* (2009.01)
*H04W 16/08* (2009.01)

(58) Field of Classification Search
CPC ............ H04W 36/00; H04W 36/0055; H04W 36/0072; H04W 36/32; H04W 36/0061; H04W 36/0088; H04W 36/0094
See application file for complete search history.

(56) References Cited

U.S. PATENT DOCUMENTS

| | | | |
|---|---|---|---|
| 6,539,227 | B1 | 3/2003 | Jetzek et al. |
| 7,643,830 | B2 | 1/2010 | Catovic et al. |
| 7,808,970 | B2 | 10/2010 | Narayanan et al. |
| 8,081,602 | B2 | 12/2011 | Bernhard et al. |
| 8,331,936 | B2 | 12/2012 | Alonso-Rubio et al. |
| 8,538,435 | B2 | 9/2013 | Immendorf et al. |
| 8,880,090 | B2 | 11/2014 | Tafreshi |
| 8,903,399 | B2 | 12/2014 | Gunnarsson et al. |
| 8,954,075 | B2 | 2/2015 | Paterson |
| 9,161,283 | B2 | 10/2015 | Kallin |
| 9,179,363 | B2 | 11/2015 | Siomina |
| 9,253,699 | B2 | 2/2016 | Choi et al. |
| 2009/0046656 | A1* | 2/2009 | Kitazoe ............ H04W 36/0055 370/331 |
| 2011/0059741 | A1* | 3/2011 | Klein .................... H04W 36/30 455/436 |
| 2012/0244863 | A1* | 9/2012 | Burnette ............... H04W 28/24 455/436 |
| 2012/0282931 | A1* | 11/2012 | Giustina ............... H04W 36/22 455/437 |
| 2013/0109389 | A1 | 5/2013 | Olofsson et al. |
| 2014/0120921 | A1 | 5/2014 | Keskitalo et al. |
| 2014/0355463 | A1 | 12/2014 | Smith |
| 2014/0355570 | A1 | 12/2014 | Smith |
| 2015/0078344 | A1* | 3/2015 | Futaki ................... H04W 24/02 370/332 |
| 2015/0141018 | A1 | 5/2015 | Kapoulas et al. |
| 2015/0141021 | A1 | 5/2015 | Kapoulas et al. |
| 2015/0245261 | A1 | 8/2015 | Teyeb |
| 2015/0373611 | A1 | 12/2015 | Liu |
| 2017/0289889 | A1* | 10/2017 | Sahu ................... H04L 43/0888 |
| 2019/0104442 | A1* | 4/2019 | Witzel ................ G06F 9/45558 |

FOREIGN PATENT DOCUMENTS

| | | |
|---|---|---|
| WO | WO2015026286 | 2/2015 |
| WO | WO2015135584 | 9/2015 |
| WO | WO2015164712 | 10/2015 |

OTHER PUBLICATIONS

Ahmad, Ijaz et al., "Load Balancing in Software Defined Mobile Networks.", Software Defined Mobile Networks (SDMN): Beyond LTE Network Architecture (2015): 225-245., 2015.

Dongwook, Kim et al., "Adaptive Handoff Algorithms for dynamic traffic load distribution in 4G mobile networks.", Advanced Communication Technology, 2005, ICACT 2005. The 7th International Conference on. vol. 2. IEEE, 2005.

Geng, Li et al., "Joint Dynamic Radio Resource Allocation and Mobility Load Balancing in 3GPP LTE Multi-Cell Network.", Radioengineering (2015)., 2015.

Hampel, Georg et al., "The tradeoff between coverage and capacity in dynamic optimization of 3G cellular networks.", Vehicular Technology Conference, 2003. VTC 2003-Fall. 2003 IEEE 58th. vol. 2. IEEE, 2003.

Mishra, Sumita et al., "Load Balancing Optimization in LTE/LTEA Cellular Networks: A Review", arXiv preprint arXiv:1412.7273 (2014).

Nasri, Ridha et al., "Handover adaptation for dynamic load balancing in 3GPP long term evolution systems.", arXiv preprint arXiv:1307.1212, http://arxiv.org/pdf/1307.1212.pdf (2013).

Nohrborg, Magdalena , "SON: Self-Organizing Networks.", 3gpp.org, Mar. 6, 2014.

Osterbo, Olav et al., "Benefits of Self-Organizing Networks (SON) for Mobile Operations", J. Computer Networks & Comm., vol. 2012 (2012), Art. ID 862527, 16 pgs., 2012.

* cited by examiner

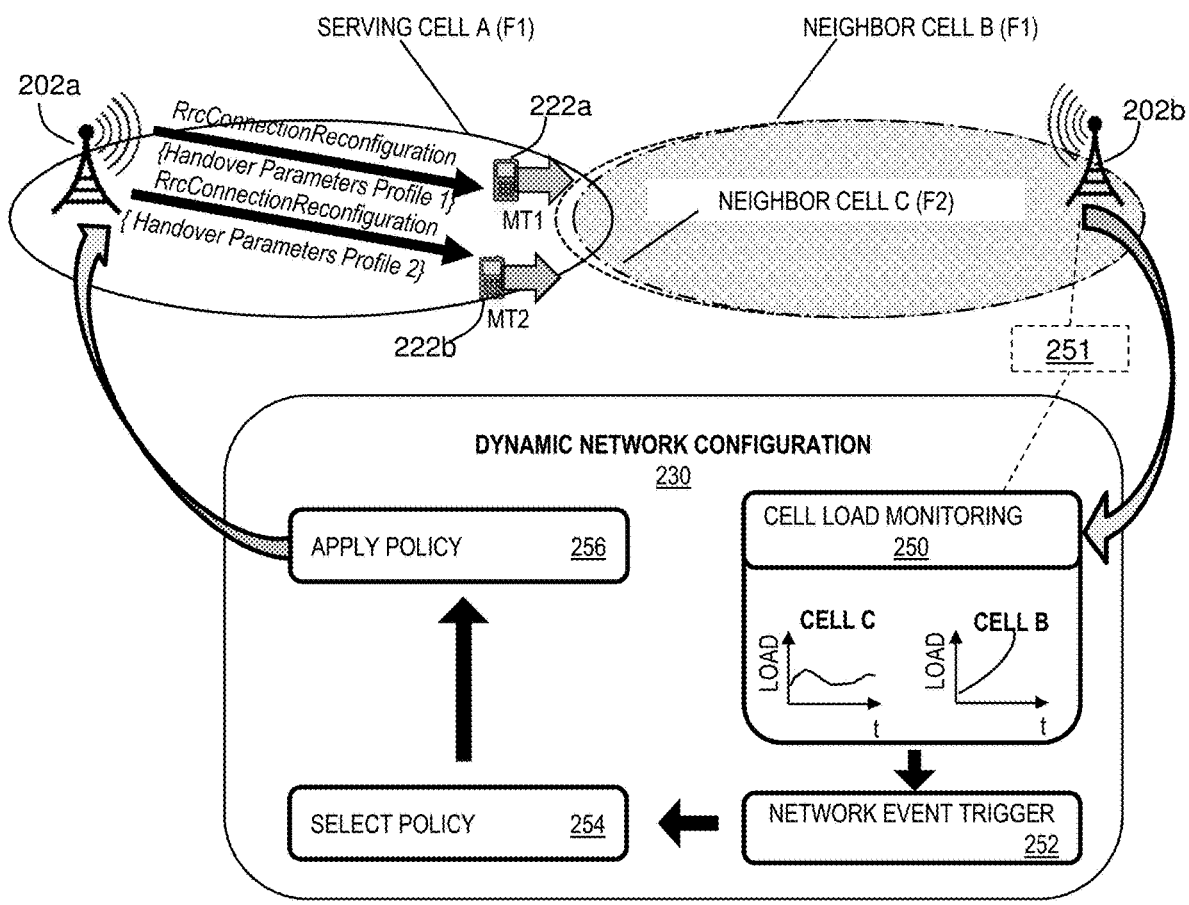
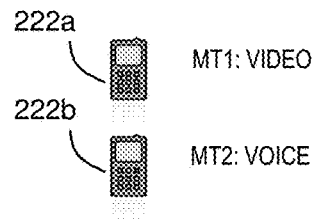
200
FIG. 2

400

| Configuration Policy | USER/MT | Neighbor Cell EARFCN | Neighbor Cell PCI | QCI value | Thresh1$_{QCI}$ (dBm) | Thresh2$_{QCI}$ (dBm) | Hysteresis (dB) | Offset$_{neig}$ $_{k,freq}$ (dB) | Offset$_{neigh,cell}$ (dB) | Meas$_{serv}$ (RSRP in dBm) | Meas$_{neigh}$ (RSRP in dBm) |
|---|---|---|---|---|---|---|---|---|---|---|---|
| ConfigPOL_0 | 1 | 650 | 100 | 1 | -105 | -110 | 3 | 3 | 0 | -110 | -105 |
| | | 650 | 200 | 1 | -105 | -110 | 3 | 3 | 6 | -110 | -105 |
| | | 1950 | 300 | 1 | -105 | -110 | 3 | 0 | 0 | -110 | -105 |
| | | 1950 | 400 | 1 | -105 | -110 | 3 | 0 | 0 | -110 | -100 |
| | | ... | ... | ... | ... | ... | ... | ... | ... | ... | ... |
| | | 650 | 100 | 5 | -105 | -110 | 3 | 3 | 0 | -110 | -100 |
| | | 650 | 200 | 5 | -105 | -110 | 3 | 3 | 6 | -110 | -100 |
| | | 1950 | 300 | 5 | -105 | -110 | 3 | 0 | 0 | -110 | -100 |
| | | 1950 | 400 | 5 | -105 | -110 | 3 | 0 | 0 | -110 | -100 |
| | | ... | ... | ... | ... | ... | ... | ... | ... | ... | ... |
| | 2 | 650 | 100 | 9 | -106 | -105 | 3 | 3 | 0 | -110 | -100 |
| | | 650 | 200 | 9 | -106 | -105 | 3 | 3 | 24 | -110 | -100 |
| | | 1950 | 300 | 9 | -106 | -105 | 3 | 0 | 0 | -110 | -100 |
| | | 1950 | 400 | 9 | -106 | -105 | 3 | 0 | 0 | -110 | -100 |
| | | ... | ... | ... | ... | ... | ... | ... | ... | ... | ... |

800

850

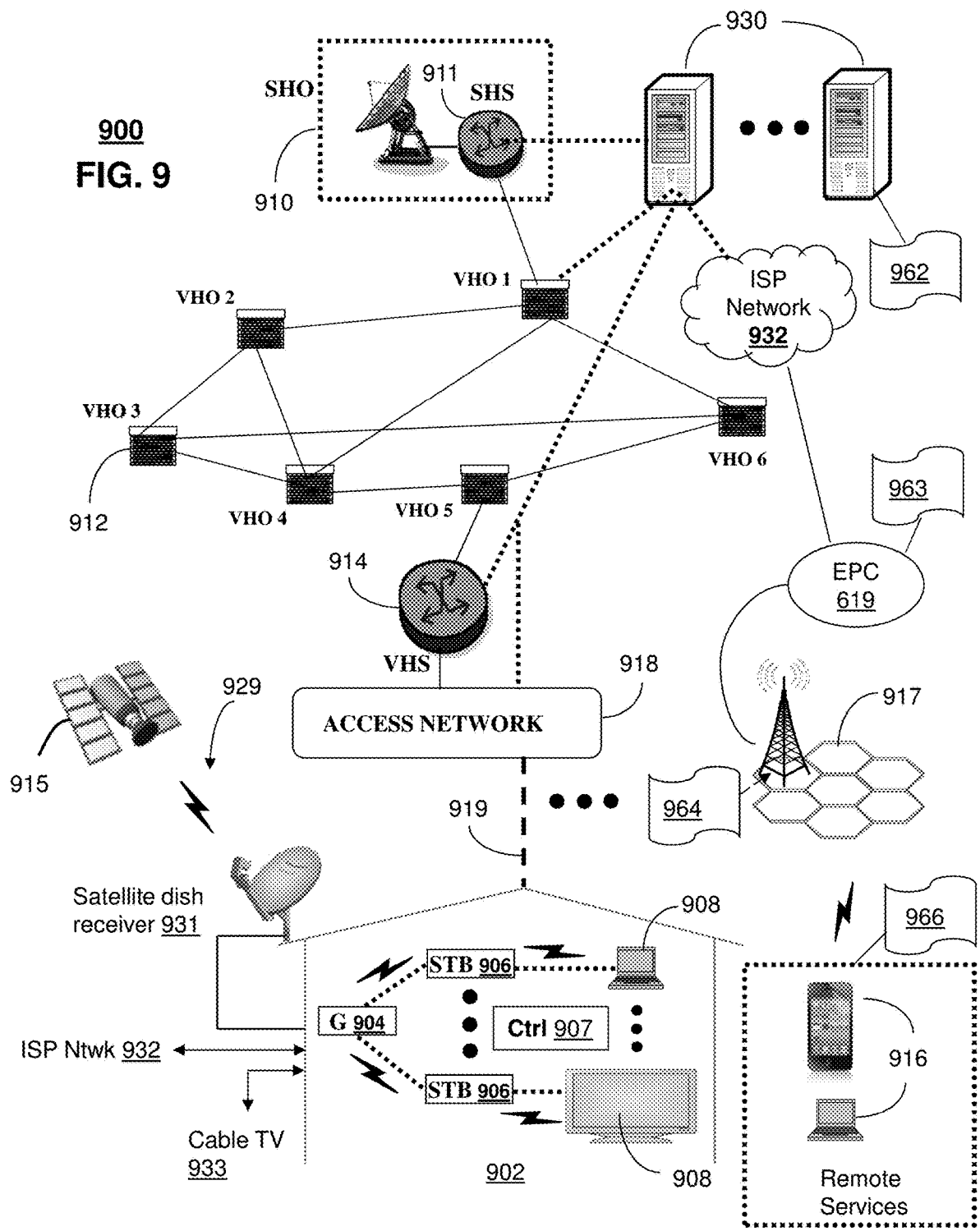

MANAGEMENT OF MOBILITY TRAFFIC FLOWS IN MOBILE CELLULAR NETWORKS

FIELD OF THE DISCLOSURE

The subject disclosure relates to a management of mobility traffic flows in mobile cellular networks.

BACKGROUND

Spectrum for the deployment of mobile cellular networks, such as LTE networks, consists of different operating frequency bands and also supports different channel bandwidths, e.g., 5, 10, 15, 20 MHz. In order to meet capacity needs and also for spectrum licensing and deployment flexibility reasons, mobile operators often deploy LTE networks in noncontiguous spectrum segments that can span multiple frequency bands. As a result, in a given cell tower sector aimed to provide service within a geographical area, a number of LTE cells are collocated and arranged in different frequency bands and/or bandwidths. Considering also that LTE networks are typically deployed on the same towers and sectors already in use by the existing mobile cellular networks, such as UMTS, it becomes apparent that spectrum fragmentation spans across radio access technologies as well.

BRIEF DESCRIPTION OF THE DRAWINGS

Reference will now be made to the accompanying drawings, which are not necessarily drawn to scale, and wherein:

FIG. 2 depicts an illustrative embodiment of a portion of a mobile cellular network including an example application of a dynamic network configuration function;

FIG. 9 depict illustrative embodiments of communication systems that provide media services over wireless mobile networks of FIGS. 1-2;

DETAILED DESCRIPTION

Figure 1:
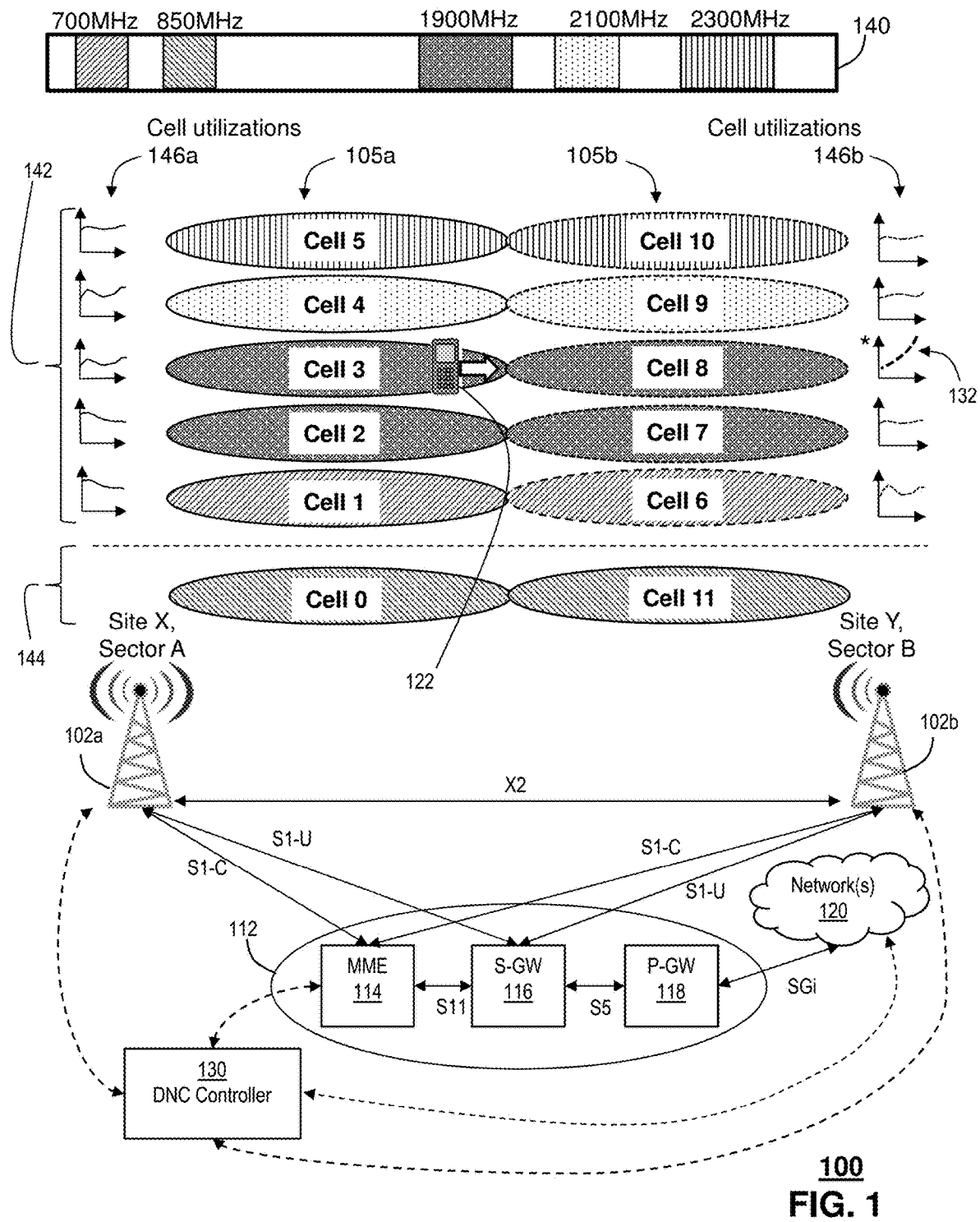
FIG. 1 depicts an illustrative embodiment of mobile cellular network including a dynamic network configuration function.

For a mobile network in which a number of cells cover the same geographical area, it becomes challenging to manage traffic flows due to mobility for users moving from one geographical area to another. The situation is further complicated by the variety of services offered over the mobile networks, e.g., over LTE and UMTS networks. Consequently, it is not uncommon for unusual traffic load conditions to occur on occasion within a cell. Such increases to traffic load can be sudden and unanticipated. Such traffic load anomalies, once detected, demand timely actions in order to efficiently manage network capacity and sustain Quality of Service (QoS) to mobile users.

The subject disclosure describes, among other things, illustrative embodiments for providing a dynamic network configuration (DNC) framework that detects network events and responds by applying configuration changes according to operational policy. The configuration changes facilitate a service and load aware handover configuration policy that can be applied when cell load conditions call for such an action. Other embodiments are described in the subject disclosure.

One or more aspects of the subject disclosure include a process for configuring a handover procedure of a user equipment from a source cell to a target cell within a cellular network system. The process includes monitoring a utilization of a target cell configured according to a first configuration policy, detecting a triggering event based on the monitoring of the utilization, and determining a second configuration policy, responsive to the triggering event. The second configuration policy includes a handover configuration parameter based on one of a user of the user equipment, a service utilized by the user equipment or a combination thereof. The process further includes identifying a target cell from a number of neighboring cells of the source cell based on the one of the user of the user equipment, the service utilized by the user equipment, a neighbor cell relation of the target cell, a neighbor cell load of the target cell, or a combination thereof. The handover configuration parameter is provided to the source cell, wherein the source cell provides the handover configuration parameter to the user equipment connected to the source cell. The user equipment performs handover measurements from the source cell to the target cell based on the handover configuration parameter, whereby a handover of the user equipment from the source cell to the target cell is based on the handover measurements.

One or more aspects of the subject disclosure include a device that includes a processor and a memory that stores executable instructions. The instructions, when executed by the processor, facilitate performance of operations that include detecting a triggering event based on a monitoring of utilization of a target cell within a cellular network system and determining a configuration policy, responsive to the triggering event. The configuration policy comprises a handover configuration parameter based on one of a user of user equipment, a service utilized by the user equipment or a combination thereof. The operations further include identifying a target cell from a number of neighboring cells of the source cell, and configuring a handover procedure of the user equipment from the source cell to the target cell based on the handover configuration parameter. The source cell provides the handover configuration parameter to the user equipment connected to the source cell. The user equipment performs handover measurements from the source cell to the target cell based on the handover configuration parameter, whereby a handover of the user equipment from the source cell to the target cell is based on the handover measure.

One or more aspects of the subject disclosure include detecting a triggering event based on a monitoring of utilization of a target cell within a cellular network system. A configuration policy including a handover configuration parameter is determined responsive to the triggering event. The handover configuration parameter is based on one of a user of user equipment, a service utilized by the user equipment or a combination thereof. A target cell of a plurality of neighboring cells of the source cell is identified and a handover procedure of the user equipment from the source cell to the target cell is configured based on the handover configuration parameter. The source cell provides the handover configuration parameter to the user equipment connected to the source cell. The user equipment performs handover measurements from the source cell to the target cell based on the handover configuration parameter, whereby a handover of a user equipment from the source cell to the target cell is based on the handover measure FIG. 1 depicts an illustrative embodiment of mobile cellular network 100 including a DNC function. The DNC function facilitates a change in how handovers of mobile terminals are implemented between neighboring cells in response to a triggering event. The triggering event can be based on a network state, such as utilization of a particular cell. For example, when a utilization metric of a mobility target cell crosses a threshold value, an updated configuration policy is identified. Identification of the updated configuration policy can be based on one or more of a current or former configuration policy and/or the type of triggering event. The new configuration policy can include one or more configuration parameters and corresponding parameter values.

The network 100 includes a first base station 102a that provides wireless coverage in a first cellular region 105a. The first cellular region 105a can be an entire cell, one or more sectors of a cell, or some other sub-region of the cell. For example, a substantially circular or hexagonal cell can be divided into three sectors, each spanning about 120 degrees of substantially non-overlapping coverage. The numbers of sectors as well as a diameter/radius of a cell generally depends on network planning, design, and implementation. Smaller cells with multiple sectors can be provided in dense urban environments to accommodate a greater number of mobile users, whereas larger cells with fewer sectors can be provided in rural areas with fewer mobile users. The network 100 includes at least a second base station 102b that provides coverage in a second cellular region 105b. The second cellular region 105b can be overlapping, or adjacent to the first cell 105a, as shown.

In the illustrative example, Sector A of Site X is served by the first base station 102a, and Sector B of Site Y is served by the second base station 102b. In the illustrative example, the first base station 102a includes radio equipment that communicates according to one or more radio access technologies and/or in one or more frequency or spectral bands. Likewise, the second base station 102b includes radio equipment that provides a wireless coverage within the second cell 105b according to one or more radio access technologies and/or in one or more frequency or spectral bands.

In more detail, Sector A of Site X includes six cells, or frequency blocks, with one cell providing UMTS service 144 and the remaining cells providing LTE service 142. Namely, Cell_0, a UMTS cell, operates in the 850 MHz band. Cell_1-Cell_5 are LTE cells, with Cell_1 operating in the 700 MHz band, Cell_2 and Cell_3 operating in the 1900 MHz band, Cell_4 operating in the 2100 MHz band and Cell_5 operating in the 2300 MHz band. A spectral map 140 showing the non-contiguous spectral segments is provided for reference. Likewise, Sector B of Site Y includes six cells. Cell_11 is a UMTS cell operating in the 850 MHz band. Cell_6-Cell_10 are LTE cells, with Cell_6 operating in the 700 MHz band, Cell_7 and Cell_8 operating in the 1900 MHz band, Cell_9 operating in the 2100 MHz band and Cell_10 operating in the 2300 MHz band.

Cell utilizations 146a are shown for each of the LTE cells of Sector A. The cell load or utilizations 146a are shown as graphs of a utilization parameter versus time. Likewise, similar cell load or utilizations 146b are shown for each of the LTE cells of Sector B. Without limitation, the cell load can be expressed as a metric indicating a utilization of one or more network resources. For example, in an LTE system, cell load or utilization can represent a utilization of physical resource blocks (PRB), such as a percentage of available PRB capacity, an absolute measure of PRB usage, an average over a predetermined number of PRBs and/or predetermined time interval, and so forth. The PRB utilization can be determined based on one or more of uplink (UL) PRBs, downlink (DL) PRBs, or a combination of UL and DL PRBs. Combinations, for example, can include a maximum, e.g., max (UL, DL), minimum, total, composite, e.g., UL+DL, ratios, e.g., UL/DL, and so forth.

In response the identification of the updated configuration policy, configuration parameter(s) and corresponding value(s) can be promulgated to one or more neighboring cells of the target cell. The neighboring cell(s), in turn, can promulgate the parameter(s) and corresponding value(s) to one or more mobile terminals connected to or otherwise being served by the neighboring cell(s). The mobile terminals can include those mobile terminals already having established a connected mode at the neighboring cell when the parameters and values are received, as well as other mobile terminals that may subsequently connect to the neighboring cell.

The mobile terminals 122, in turn, apply the configuration parameter(s) and corresponding value(s) to handover measurements, the results of which can be provided in a form of a handover report to the serving cell. As described in more detail below, the handover reports alter handover performance based on the configuration parameter(s) and corresponding value(s). In the illustrative example, such handover measurements determined by the mobile terminal 122 may not result in a handover from Cell_3 to Cell_8 under certain circumstances.

The mobile terminal, or user equipment (UE) 122 implements protocols and features of one or more radio access technologies, such as LTE. It is common practice to add capacity to a congested cellular region 105 by adding additional cells, e.g., each supported by respective radio equipment. The cells operate at different RF spectral bands within the same cellular region 105. The circumstances can include an identity of particular user of the mobile terminal 122, e.g., a user account, user profile, status and/or privileges and/or a particular service utilized by the mobile terminal 122. In some embodiments, the circumstances can include a particular neighbor cell relation between Cell_3 and Cell_8 and/or a cell load or utilization of Cell_8. Accordingly, the mobile terminal may determine that a handover to Cell_8 should be delayed, or avoided altogether.

Where other cells are available within the same geographical region, e.g., Sector B of Site Y, the mobile terminal 122 can generate a handover report(s) that identifies one or more of the other cells, e.g., Cell_7, for an intra-frequency, intra-radio access technology (RAT) handover, Cell_6, Cell_9 or Cell_10 for an inter-frequency, intra-RAT handover, or Cell_11 for an inter-frequency, inter-RAT handover. In the illustrative example, a handover from Cell_3 to Cell_8 may be preferred, because it represents an intra-frequency/intra-RAT transfer. Such a preferred transfer, however, can be discouraged or otherwise blocked as disclosed herein based on a utilization of Cell_8.

As Cell_8 experiences a rapidly increasing utilization 132, updated configuration parameters are identified and forwarded to the neighboring eNB 102a. The configuration parameters can include different individual cell offset values for different services and/or different users. The mobile terminal 122 applies the different offset values to handover calculations according to the user and/or service(s) utilized by the mobile terminal 122. As described elsewhere herein, the different offset values can be utilized in handover calculations to discourage a handover of a high-volume data user, e.g., engaged in a video streaming service, from being transferred from Cell_3 to Cell_8, at least during periods of high utilization 132.

Should the utilization of Cell_8 return to a lower or more acceptable level, a further update of configuration parameter(s) and their corresponding value(s) can be promulgated to neighboring cells, and in turn, to the mobile terminal(s) 122 to further modify handover measurements and reports. In the illustrative example, such an update of configuration parameters and values, responsive to a reduction in utilization of Cell_8, can facilitate a transfer of the mobile terminal 122 from Cell_3 to Cell_8, in spite of the mobile terminal 122 being a high-volume data user.

Another example of cell load or utilization can include cell throughput. Cell throughput can be determined according to one or more metrics, such as data transfer rates, data transfer quantity, message transfer rates and or quantities, and so forth. It is understood that other metrics, such as error rates, including measures of error correction, such as message success, retries, and so forth can be used alone or in combination with any measure of cell throughput.

Other examples of cell load or utilization can include, without limitation, hardware utilization, S1 transport utilization, UL rise over thermal noise. The UL rise over thermal noise can include a measure and/or estimate of spectral energy in the UL spectral region and based on UL traffic, in comparison to a corresponding noise floor, e.g., thermal noise. Hardware utilizations can include one or more of processor utilization, memory utilization, failure status, e.g., including failover and/or maintenance statistics.

It should be understood that one or more of the foregoing measures of cell load or utilization can be applied alone or in any combination. It should be understood further that such utilization values alone and/or combined can be adjusted or otherwise filtered. In at least some embodiments, statistics of such values are determined to provide average values, moving average values, variances, standard deviations, medians, modes and the like. Processing of utilization values can include one or more of regression analysis, predictive analysis, and the like.

In some embodiments, one or more of the aforementioned load and/or utilization values can be stored in a historical database. The stored values can be analyzed to obtain predictive trends. Such trend analysis can include observed trends, e.g., versus time of day, day of week, month, year and event related trends. Alternatively or in addition, trend analysis can include event-related trends. Such events can include social events, such as occurrences of sporting events, concerts, and the like, during which a heavy network utilization of certain nodes can be predicted. Other events can include natural events, such as weather observations, forecasts, alerts and/or traffic events, such as road and or pedestrian traffic observations, forecasts, alerts. Still other events can include reported news events, emergency broadcasts, and the like.

In the illustrative example, a mobile terminal 122 of a data heavy LTE user is moving away from Cell_3 in Sector A of Site X towards Sector B of Site Y. Sector B has five (5) LTE cells in four (4) different frequency blocks and one UMTS cell. Cell_8 exhibits exponential traffic increase. Therefore, handover to Cell_8 should be prevented in order to avoid further increasing the load in Cell_8. Instead handover to one of the other co-sectored cells in Site Y should be performed.

The base stations 102a, 102b (generally 102) represent a Radio Access Network (RAN) portion of the network 100. The RAN, sometimes referred to as an air interface, implements radio access technology between a core network 112 and the UEs 122. In a $3^{rd}$ Generation Partnership Project (3GPP) LTE network 100, a RAN is referred to as an Evolved Universal Terrestrial Access Network (E-UTRAN), a base station 102 is referred to as an Evolved Node B (eNodeB or eNB) 102, and the core network 112 is referred to as an Evolved Packet Core (EPC) 112.

The EPC 112 can include several functional elements as disclosed in a general description of the E-UTRAN architecture, provided in 3GPP TS 36.401, Ver. 13.0.0, incorporated herein by reference in its entirety. For brevity, a subset of the functional elements, sometimes referred to as the "main LTE packet core elements" are illustrated in FIG. 1, including a Mobility Management Entity (MME) 114, a Serving Gateway (S-GW) 116 and a Packet Data Network (PDN) Gateway (P-GW) 118.

The MME 114 provides a control node responsible for features including tracking, paging, retransmissions, and for supporting an idle mode of UE 122. The MME 114 is also involved in bearer activation and its deactivation procedures, choosing the S-GW 116 for a UE 122 in process of initial attach and when the intra-handover take place which involves a core network node relocation. The MME 114 without limitation, can also authenticate a user, handle Non-Access Stratum (NAS) signaling, and generate and allocate temporary UE identities. In at least some embodiments, the MME 114 can manage UE roaming restrictions. MME is also termination point of ciphering and integrity protection for NAS signaling. Lawful Interception (LI) of signaling could be also supported by MME entity. It also provides the control plane function for mobility between LTE and 2G/3G networks by the S3 interface (from SGSN to MME).

The S-GW 116 terminates an interface towards E-UTRAN. For each UE 122 associated with the Evolved Packet Service (EPS) at a given point of time, there is a single S-GW 116. The S-GW 116 is responsible for handovers with neighboring eNB's 102, also for data transfer in terms of all packets across a user plane. The S-GW can provide a mobility interface to other networks such as 2G/3G, as well as providing monitoring and maintaining context information related to the UE 122 during its idle state and generates paging requests when data arrives for the UE 122 in downlink direction. (e.g., somebody's calling).

The P-GW 118 is a gateway that terminates an SGi interface towards a PDN 120. If a UE 122 is accessing multiple PDNs 120, there may be more than one P-GW 118 for that UE 122. The P-GW 118 provides an "anchor" point for mobility between 3GPP and non-3GPP technologies. The P-GW 118 also provides connectivity from the UE 122 to external the PDN 120 by being the point of entry or exit of traffic for the UE 122. The P-GW 188 manages policy enforcement, packet filtration for users, charging support and lawful intercept.

The radio equipment at each of the base stations 102 implement one or more of the protocols of the E-UTRAN, such as media access control (MAC) protocols. A radio of each cell is tuned to a respective carrier frequency of an RF spectral band. The carrier frequency can reside in one of a number of available frequency bands, e.g., 650 MHz, 700 MHz, 850 MHz, 1700 MHz, 1900 MHz, 2.3 GHz, and can have an associated bandwidth, e.g., 3 MHz, 5 MHz, 10 MHz, 15 MHz, 20 MHz, depending upon the application, the subscription, network resources or any public band or future cellular band. The eNB 102 can support DL communications from the eNB 102 to the UE 122, as well as UL communications from the UE 122 to the eNB 102. In at least some embodiments, the UL and DL communications use different modulation/multiplexing techniques. Namely, DL communications can include Orthogonal Frequency Division Multiplex (OFDM), whereas, UL communications can include Single Carrier-Frequency Division Multiple Access (SC-FDMA). An overall description of E-UTRAN is disclosed in 3GPP TS 36.300, Ver. 13.2.0, incorporated herein by reference in its entirety. A general description of the physical layer is disclosed in 3GPP TS 36.201, Ver. 13.0.0, incorporated herein by reference in its entirety. A general description of the UE radio transmission and reception is disclosed in 3GPP TS 36.101, Ver. 13.2.1, incorporated herein by reference in its entirety. It is to be understood that the techniques disclosed herein can be applied to any radio modulation currently know or future, including any FDD or TDD schemes.

The network includes at least one DNC control module 130 to facilitate allocation, access, management and/or servicing of mobile user traffic among the available sectors and cells. In some applications, the DNC control module 130 can be referred to as a resource conservation controller 130, because it allows for an efficient allocation of different grades of wireless service among different carrier frequencies providing overlapping coverage in proximity to a serviced UE 122. Namely, more costly and complex radio functions that support the highest QCI grades of service, including VoLTE are reserved for such services, while other less costly and less complex radios that support some QCI grades of service, but not the highest grade or grades of service, are configured to provide such lower-tier services. An example of a range of QCIs is provided in Table 1.

TABLE 1

Standardized QCIs for LTE.

| QCI | Resource type | Priority | Packet delay budget (ms) | Packet error loss rate | Example services |
|---|---|---|---|---|---|
| 1 | GBR | 2 | 100 | 10-2 | Conversational voice |
| 2 | GBR | 4 | 150 | 10-3 | Conversational video (live streaming) |
| 3 | GBR | 5 | 300 | 10-6 | Non-conversational video (buffered streaming) |
| 4 | GBR | 3 | 50 | 10-3 | Real-time gaming |
| 5 | Non-GBR | 1 | 100 | 10-6 | IMS signaling |

TABLE 1-continued

Standardized QCIs for LTE.

| QCI | Resource type | Priority | Packet delay budget (ms) | Packet error loss rate | Example services |
|---|---|---|---|---|---|
| 6 | Non-GBR | 7 | 100 | 10-3 | Voice, video (live streaming), interactive gaming |
| 7 | Non-GBR | 6 | 300 | 10-6 | Video (buffered streaming) |
| 8 | Non-GBR | 8 | 300 | 10-6 | TCP-based (for example, WWW, e-mail), chat, FTP, p2p file sharing, progressive video and others |
| 9 | Non-GBR | 9 | 300 | 10-6 | |

FIG. 2 depicts an illustrative embodiment of a portion of a mobile cellular network 200 including an example application of a dynamic network configuration function. The network 200 includes a first eNB 202a providing a serving cell, Cell_A in a first sector, and a second eNB 202b providing two neighboring cells, Cell_B and Cell_C in a second sector. Two mobile terminals 222a, 222b (generally 222) being served by Cell_A, are moving away from the first sector of the first eNB 202a towards the second sector of the second eNB 202b.

The network 200 also includes a DNC controller, 230 in communication with the first and second eNBs 202a, 202b (generally 202). In the illustrative example, the DNC controller 230 includes a cell load monitoring module 250, a trigger module 252, a policy selection or rule module 254 and a policy application module 256. The cell load monitoring module 250 receives cell utilization information, such as a cell traffic and/or PRB load state of Cell_B and Cell_C. The cell utilization can be self-reported, e.g., by the second eNB 202b, and/or reported upon request or polling by the DNC controller 230. Alternatively or in addition, the cell utilization can be determined by a cell utilization detector 251, shown in phantom.

In some embodiments, the cell-utilization detector 251 includes a wireless device within the second sector of the second eNB 202b. The cell-utilization detector 251 wirelessly detects or "sniffs" spectra of Cell_B and/or Cell_C to determine utilization information. Alternatively or in addition, the cell-utilization detector 251 can include a network accessible device that intercepts network traffic associated with utilization of Cell_B and/or Cell_C. Such network traffic utilization can include packet monitoring across one or more of the standard interfaces, such as the S1-C, S1-U, S11, S5 and/or SGi interfaces. It is understood that in some embodiments, the cell-utilization detector 251 can reside in one of the evolved packet core 112 modules, e.g., the MME 114, the S-GW 116, and/or the P-GW, in Self-Organized or Self-Optimized Network (SON) servers, or other nodes as might be included in advanced architectures.

The trigger module 252 is in communication with the cell load monitoring module 250. The trigger module 252 can be configured with logic that identifies a triggering event based on monitored information provided by the cell load monitoring module 250. It is understood that the trigger module 252 can operate according to one or more different triggers, e.g., operating substantially simultaneously to trigger different events based on time-varying cell utilization states. For example, one trigger might indicate a high load condition at Cell_B, based on monitoring information of Cell_B identifying an increasing utilization that has crossed a first trigger threshold. Likewise, another trigger might indicate a normal or low load condition at Cell_B, based on the monitoring information of Cell_B identifying a decreasing utilization that has crossed a second trigger threshold. The first and second trigger thresholds can be the same or different, according to the trigger logic. It is also understood that the trigger logic can be updated or otherwise modified from time to time.

The policy selection or rule module 254 is in communication with the trigger module 252 and receives an indication of an occurrence of a trigger event. The information identifying the occurrence of the trigger event can include an indication of an associated trigger. The policy selection module 254, in turn, selects a policy from a number of available policies, responsive to the detection of the triggered event. The particular policy selected can be based on one or more values, such as the type of trigger, the type of triggered event, the cell(s) related to the triggered event, and a current configuration policy in place at the time of the triggered event.

The policy application module 256 is in communication with the policy selection module 254 and receives the selected policy, an indication of the selected policy, and/or corresponding configuration parameter(s) and/or associated parameter value(s). The selected policy and/or configuration parameter(s)/value(s) are provided to one or more cells that neighbor the cell associated with the trigger event. In the illustrative example, a trigger event resulting from monitor information that indicates a high and/or rapidly increasing load condition at Cell_B, results in selection of a policy having one or more configuration parameter(s) and/or associated value(s). The configuration parameter(s) and/or associated values are provided to the first eNB 202a based on its association with Cell_A as a neighboring cell to Cell_B.

The first eNB 202a, in turn, provides updated handover profile parameters to the mobile terminals 222 being served by Cell_A. The updated handover profile parameters can include one or more of the configuration parameter(s) and/or associated values. In some embodiments, such as in an LTE network, the updated handover profile parameters can be provided to the mobile terminals 222 by way of an "RRC Reconnection Reconfiguration" procedure, e.g., as disclosed in 3GPP TS 36.331. In this manner, updated handover profile parameters are provided to the mobile terminals, allowing the mobile terminals to modify handover measurements and/or handover requests, without necessarily requiring modifications to the mobile terminals. It is understood that in some embodiments, the updated handover profile parameters can be provided to the mobile terminals by other means, such as special messages directed to the mobile terminal, e.g., by way of a mobile application and/or updated operating and/or system software of the mobile terminal.

In the illustrative example, the first mobile terminal 222a is utilizing a video service, whereas, the second mobile terminal 222b is utilizing a voice service. To the extent that the video service results in a greater utilization of a serving cell, the first mobile terminal 222a represents a greater utilization burden to a target cell. Considering that a potential target cell, e.g., Cell_B, is experiencing heavy loading conditions, a handover parameters profile is provided to the first mobile terminal 222 to affect handover measurements in a manner that discourages and/or otherwise blocks any inbound handover of the first mobile terminal 222a.

Depending on the severity of the cell load and/or the utilization impact due the voice service, handover of the second mobile terminal 222b can be discouraged or blocked in a like manner. Alternatively, the second mobile terminal 222b can be allowed to initiate a handover to Cell_B, while a similar handover of the first terminal 222a is blocked. In at least some embodiments, the different handover results can be obtained by way of a transfer of different handover parameter profiles. For example, the handover parameter profiles can include different individual cell offset values to be applied to the handover measurements by the mobile terminals 222. Based on the particular parameter values, one can be blocked, while the other is allowed. In this manner, the applied policy differentiates handover behavior based on services utilized by the mobile devices 222.

In order to modify network configuration responding to a network event, a mechanism is provided that continuously monitors for network events and based on certain rules, intervenes by reconfiguring the network accordingly. Such a mechanism can include: (i) network areas under monitoring; (ii) triggering events occurring within a monitored network area; (iii) configuration policies; (iv) rules on what configuration policy should apply when a triggering event occur; and (v) actions, application of network configuration changes.

Figure 3:
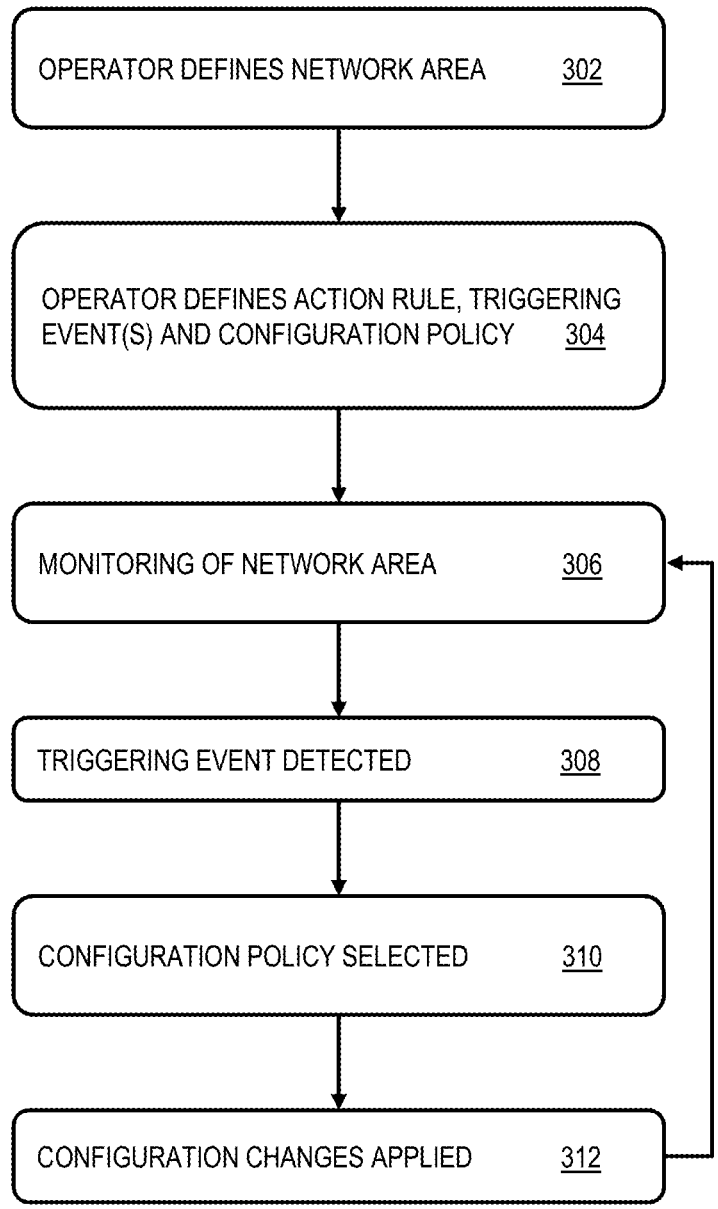
FIG. 3 depicts an illustrative embodiment of a process used in portions of the system described in FIGS. 1-2.

Such a DNC management process may operate according to the illustrative embodiment of a process 300 of FIG. 3, used in portions of the system described in FIGS. 1-2. According to the process, a network area is identified at 302. For example, a network operator and/or a third party providing operational support services to the network define a network area to be monitored and managed. Monitoring for network events takes place within a predefined area of the network, the Network Area. A network area can be for example a part of a radio access network (RAN), e.g., consisting of LTE and/or UMTS cells. Alternatively or in addition, an operator can define a network area based on geographical criteria, (e.g., region, market, zip Code) or based on network infrastructure characteristics (e.g., macro site, indoor distributed antenna system (iDAS), outdoor distributed antenna system (oDAS), indoor small cell, outdoor small cell), and/or radio technology (e.g., LTE, UMTS, GSM), and/or radio frequency spectrum block (e.g., 700 MHz, 1900 MHz) and/or radio frequency number (e.g., evolved absolute radio-frequency channel number (EARFCN)).

One or more triggering events and associated configuration policies are determined at 304. A triggering event can be either related to the network conditions, hence a network triggering event, or related to an external application or service that could trigger configuration changes in the network, a so called external triggering event. In some instances, a network triggering event can be related to an anomalous condition observed in the network that has a negative impact on services and/or equipment. An example of network triggering event includes a metric, such as a resource utilization metric, crossing a threshold value for a certain period of time, or an equipment generated alarm (e.g., a hardware malfunction). An external triggering event can be related to a business application which is demanding enhanced QoS.

An example triggering event, X1, is triggered when the inequality below is satisfied for a time-to-trigger period:

$$\text{CellLoad} < \text{LoadThreshold} \tag{1}$$

An example triggering event, X2, is triggered when the inequality below is satisfied for a time-to-trigger period:

$$\text{CellLoad} \geq \text{LoadThreshold} \tag{2}$$

In each instance, the value CellLoad is a measured cell load metric and the value LoadThreshold is a threshold for measured cell load. The values of CellLoad and LoadThreshold can be expressed in the same units depending on the metric used to represent cell load.

In some embodiments, a rule can be identified that defines which action (e.g., apply Configuration Policy 0) will be performed when a network triggering event occurs. An example of a set of Rules for network triggering events X1 and X2 is shown below. The combination of current configuration policy (e.g., ConfigPOL_0) and network event (e.g., X2) shows the next configuration policy (e.g., ConfigPOL_1).

TABLE 2

Rules for Network Triggering Events

| | Current Configuration Policy | |
|---|---|---|
| Triggering Event | ConfigPOL_0 | ConfigPOL_1 |
| X1 | ConfigPOL_0 | ConfigPOL_0 |
| X2 | ConfigPOL_1 | ConfigPOL_1 |

A configuration policy can be built around the rules that connect network configurations to Triggering Events. An example configuration policy is provided in Table 3, below:

TABLE 3

Configuration Policy example

| RULE | TRIGGERING EVENT | CONFIGURATION POLICY | PARAMETERS |
|---|---|---|---|
| RULE_A | EVENT_0 | CONFIGPOL_0 | {[parameter1, value_i], [parameter2, value_ii], . . . , [parameterN, value_x]} |
| | EVENT_1 | CONFIGPOL_1 | {[parameter1, value_xi], [parameter2, value_xii], . . . , [parameterN, value_xx]} |
| | EVENT_2 | CONFIGPOL_2 | {[parameter1, value_xvi], [parameter2, value_xvii], . . . , [parameterN, value_xxx]} |
| . . . | . . . | . . . | . . . |
| RULE_Z | EVENT_n | CONFIGPOL_n | {[parameter11, value_i], [parameter21, value_ii], . . . , [parameterN, value_x]} |
| | . . . | . . . | . . . |

In some embodiments, each defined network area has at least one network event associated with it. A network event can be defined as any identifiable occurrence that has significance for the services offered over the network and/or network hardware/software. Network events can be related to performance and/or fault management events. For example, a performance event such as the sudden increase of the cell load (one that deviates from the norm), should be detected and addressed, in a timely manner, by modifying the network configuration to preserve the offered Quality of Service (QoS).

The triggering events and/or associated configuration policies can be defined or otherwise identified according to one or more rules. The rules can be predetermined, e.g., by an operator definition, and/or by an expert system. Such modifications can be updated responsive to other events, such as network states, and/or environmental factors, and/or maintenance states and/or network equipment states, and/or social states.

In some embodiments, the expert systems include automation, e.g., artificial intelligence, aspects to modify one or more of the triggering events or configuration policies. Thus, a DNC function controller can include a learning phase in which network response to handovers of particular users utilizing particular services occurs. Utilization states of the target nodes can be observed and a network state resulting from such handovers can be observed. In this manner, the DNC function can learn which users and/or services are likely to impact performance of a target cell, e.g., QoS, in an adverse manner. The DNC can determine and apply adjusted handover parameter profiles, monitoring network performance in a like manner. The changes can be applied systematically in a closed feedback loop arrangement. In this way, the DNC can learn or otherwise determine handover parameters automatically.

The defined network area(s) are monitored at 306. Such monitoring can include monitoring of utilization metrics, such as those illustrated in FIGS. 1-2. A triggering event based on the monitored utilization metrics is detected at 308, and a configuration policy selected at 310. The triggering events can be predetermined, e.g., as a utilization exceeding a predetermined threshold value. A first triggering event can be associated with a rising utilization metric crossing a high-utilization threshold. Such a triggering event is indicative of a high level of utilization. Likewise, a second triggering event can be associated with a falling utilization metric crossing a low-utilization threshold. The high-utilization threshold and the low-utilization threshold for the same utilization metric can be the same value, or different, e.g., applying a form of hysteresis.

Within a DNC framework, an operator can define for each triggering event, a type of event, which can be internal to the network (e.g., performance, or fault), or external to the network (e.g., external application or service). Considering a network triggering event that includes a performance related event, a metric expressed by a formula that contains an algebraic and/or logic combination of network counter(s) and/or key performance indicators (KPIs) plus aggregation level and aggregation period. For a Fault related events, a type of Alarm (e.g., critical, major, minor) and duration. Considering External Triggering Events, a triggering event can relate to a business application, a web application/service, and the like.

An operator may further define one or more of an event monitoring duration, e.g., a time interval within which the monitoring for network events is taking place. Other definable features include one or more of a trigger condition, e.g., a threshold value, or signaling message, or other, and a time-to-trigger the event.

It is understood that in at least some applications, multiple triggers can be applied. By way of non-limiting example, a first trigger can be associated with PRB utilization, while other triggers can be associated with hardware utilization, cell throughput, processing utilization, spectral utilization, and so forth. The triggers can be applied individually, such that if any one of the different triggered events occur, action is take. Alternatively or in addition, the triggers can be applied in a logical manner. For example, a triggering event can be based on one or more other triggering events. It is also conceivable that the triggering events can applied in a hierarchal manner, with certain triggering events taking priority over others when more than one triggering event is detected. Alternatively or in addition, any of the foregoing triggering events can be based upon a combination of monitored utilization metrics. Other trigger processing can include application to statistical measures of the utilization metrics, filtering, and the like.

The selected configuration policy(s) are applied at 312. Application can include transfer of handover parameter profiles to one or more mobile terminals. The mobile terminals, having been provided with the updated handover parameter profiles, apply the profiles to handover measurements, calculations and reporting. Any number of the steps can be repeated, for example, by periodically repeating steps 306-312. The repeating of any of the steps can be performed according to a schedule, e.g., according to a monitoring interval, based on seconds, minutes, hours, days and the like. Alternatively or in addition, the repeating of any of the steps can be performed according to an event, such as any of the events disclosed herein. Events can include manual initiation, e.g., by a network operator and/or network support service.

For each mobile terminal entering to RRC_CONNECTED mode in a cell, a set of parameters is chosen, based on the operators chosen mobility traffic flow strategy (e.g., turn off handover, for bearers with specific QCI value(s), towards a neighbor cell when load in that neighbor cell exceeds a threshold), and forwarded to the mode terminal via RRC dedicated signaling, e.g., RRCConnectionReconfiguration message.

Figure 4:
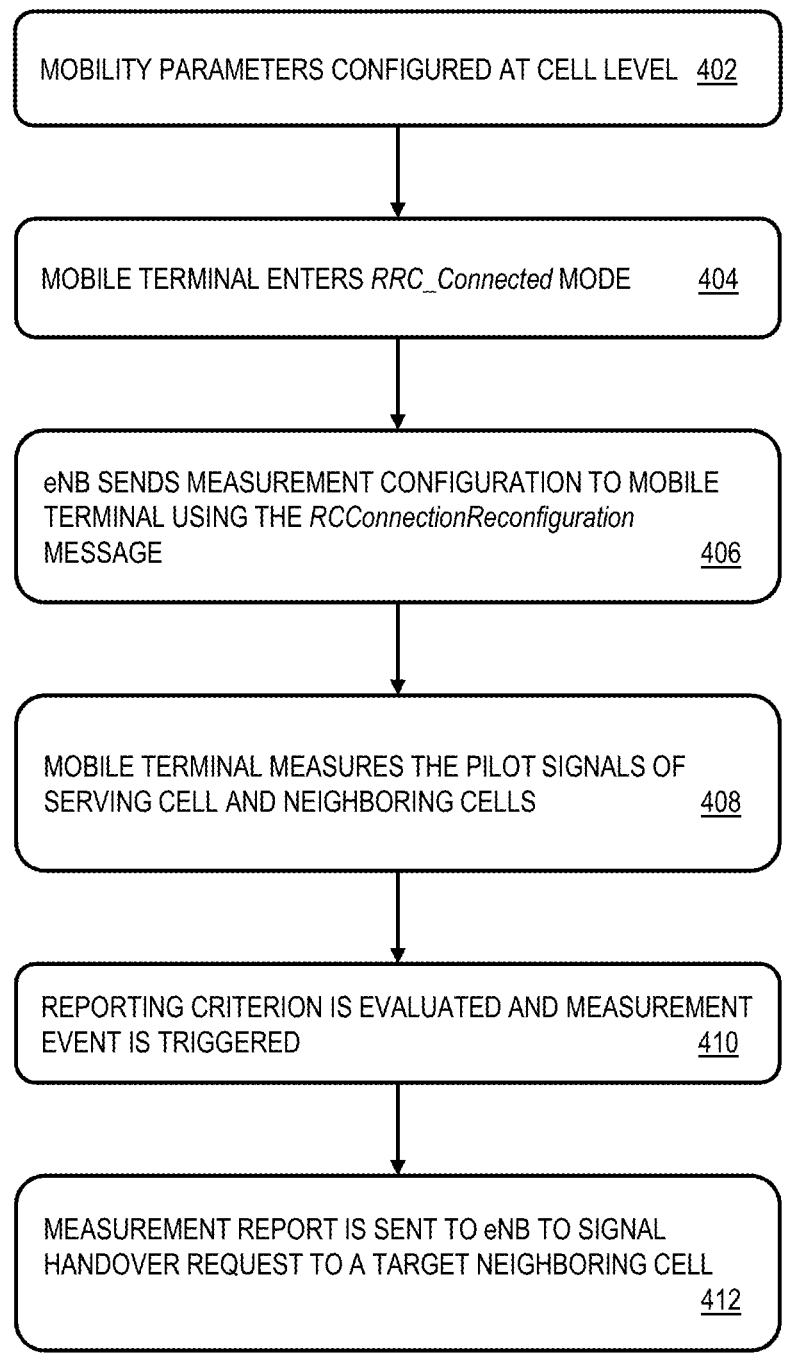
FIG. 4 depicts an illustrative embodiment of a process used in portions of the system described in FIGS. 1-2.

By modifying the offset parameters per cell relation in combination with thresholds per service type (QCI value), service biased mobility per neighboring cell relation and cell load can be realized. Hence the Measurement Report triggered to indicate a handover request to a target neighboring Cell can be dynamically managed by a DNC entity. FIG. 4 depicts an illustrative embodiment of a process 400 used in portions of the system described in FIGS. 1-2 that illustrates the concept of such a solution. According to the process 400, mobility parameters are configured at cell level at 402. For example, one or more handover parameter profiles are provided to a neighboring cell, such as Cell_A (FIG. 2). A mobile terminal enters an RRC_Connected mode, e.g., with Cell_A at 404. The first eNB 202*a* (FIG. 2) sends measurement configuration, e.g., handover parameter profiles, to one or more mobile terminals 222 using an RCConnectionReconfiguration message at 406.

The mobile terminals connected to Cell_A measure pilot signals of Cell_A and neighboring cells at 408. In the illustrative example, the neighboring cells include Cell_B and Cell_C (FIG. 2). A reporting criterion is evaluated at the mobile terminals 222 and a measurement event is triggered at 410. The reporting criterion is evaluated according to the handover parameter profiles. By such application of the adjusted or updated handover parameter profiles, the measurement event is adjusted to facilitate the DNC policy.

Thus, in the illustrative example, the handover parameter profile updated in response to determining that Cell_B is under a heavy load condition, adjusts the reporting criterion evaluation for at least the first mobile terminal 222*a* utilizing a video service. Namely, the updated handover parameter profile discourages or otherwise blocks a handover of the first mobile terminal 222*a* from Cell_A to Cell_B. Further evaluation of other neighboring cells can identify Cell_C as a suitable handover candidate. Accordingly, a measurement report is sent to the first eNB 222*a* to signal a handover request to the neighboring cell, Cell_C. The particulars of the handovers, once identified, can be accommodated according to standard procedures, such as those utilized in LTE and/or UMTS networks.

In an LTE cell, there are two sources of traffic: setup of new or modification of existing radio bearers, whose contribution to traffic load is subject to the number of users and type of services, and incoming handovers, whose contribution to traffic load is subject to user mobility and type of services, e.g., handovers of VoIP bearers add substantially less load to a cell than handovers of video streaming bearers. The later, incoming handover traffic is managed per specific type and/or user in order to prevent data heavy connections/users from moving into a cell that is experiencing abnormal traffic load conditions. This is accomplished by the service and load driven mobility traffic flow adaptation algorithm operating within the DNC framework disclosed herein.

Figure 5:
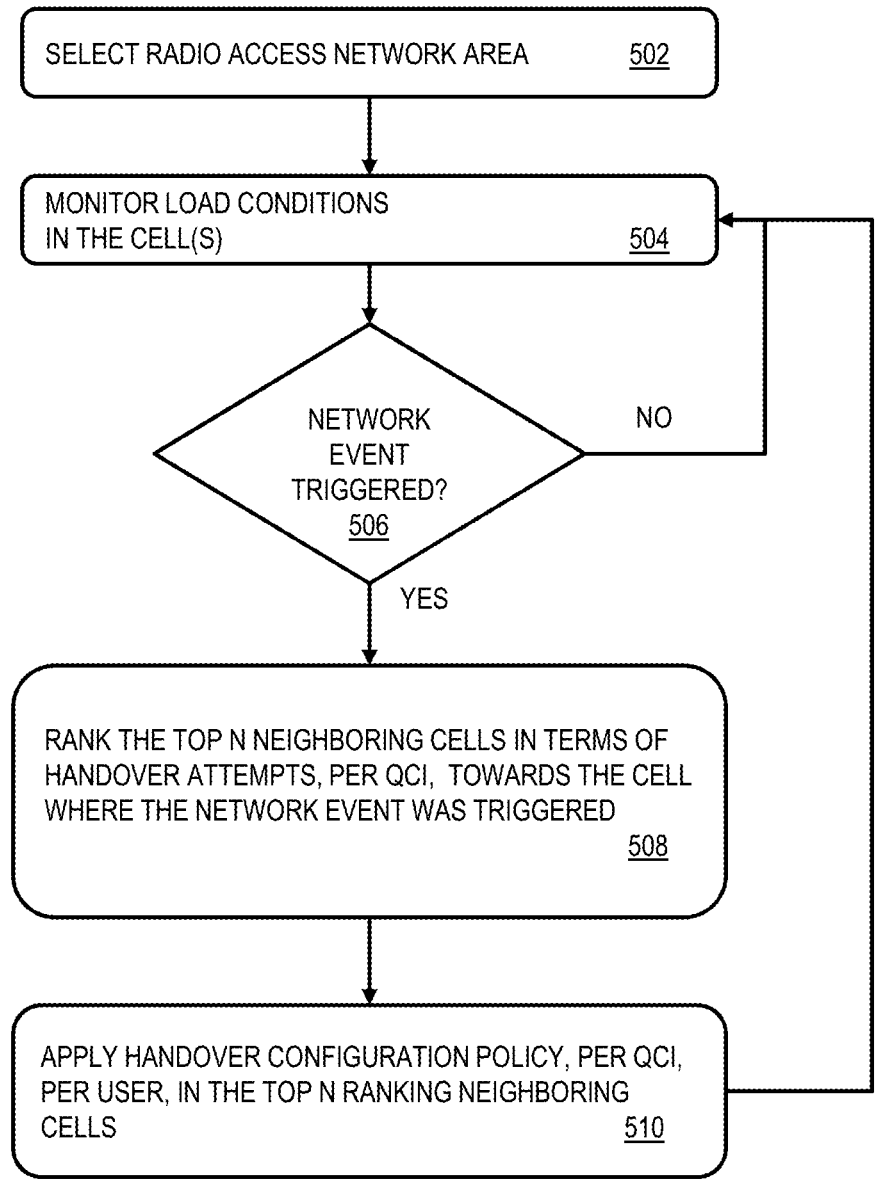
FIG. 5 depicts an illustrative embodiment of a process used in portions of the system described in FIGS. 1-2.

FIG. 5 depicts an illustrative embodiment of a workflow of operation process 500 used in portions of the system described in FIGS. 1-2. A radio access network area is selected at 502. Utilization and/or load conditions are monitored at 504 for one or more cells of the selected network area. Monitoring of the cell load conditions continues at 504 as long as a network event is not triggered at 506. To the extent that a network event is triggered at 506, one or more neighboring cells are identified at 508. The network event can be triggered in association with one of the monitored cells for which the monitored condition exceeds a threshold, or otherwise meets or exceeds a predetermined criterion.

In the illustrative example of FIG. 2, the radio access network area includes Cell_A, Cell_B and Cell_C. Cell load conditions are monitored for each of the cells at 504. When the monitored cell load at Cell_B meets or exceeds a trigger criterion, a network event is triggered in association with Cell_B, the "triggering cell." The neighboring cells include Cell_A and Cell_C. In one embodiment, all of the neighboring cells are identified at 508.

In another embodiment, the neighboring cells are further evaluated and ranked. The evaluation and ranking can be based on their relation to the triggering cell. By way of example, the top "N" neighboring cells can be ranked in terms of handover attempts per QCI, towards the triggering cell. Such ranking can be used to prioritize certain neighbor cells over other neighboring cells, allowing the handover parameter profile updates to be implemented only at those neighbor cells most likely to produce handover traffic per QCI. According to the process 500, the handover configuration policy is applied per QCI, per user in the top "N" ranking neighboring cells at 520. Such selectivity in application of the handover parameter profile update avoids unnecessary network traffic and dynamic configuration activity. It is conceivable that in some embodiments, the handover configuration policy can be applied to all neighboring cells, without the need for ranking the cells at 508.

Figure 6:
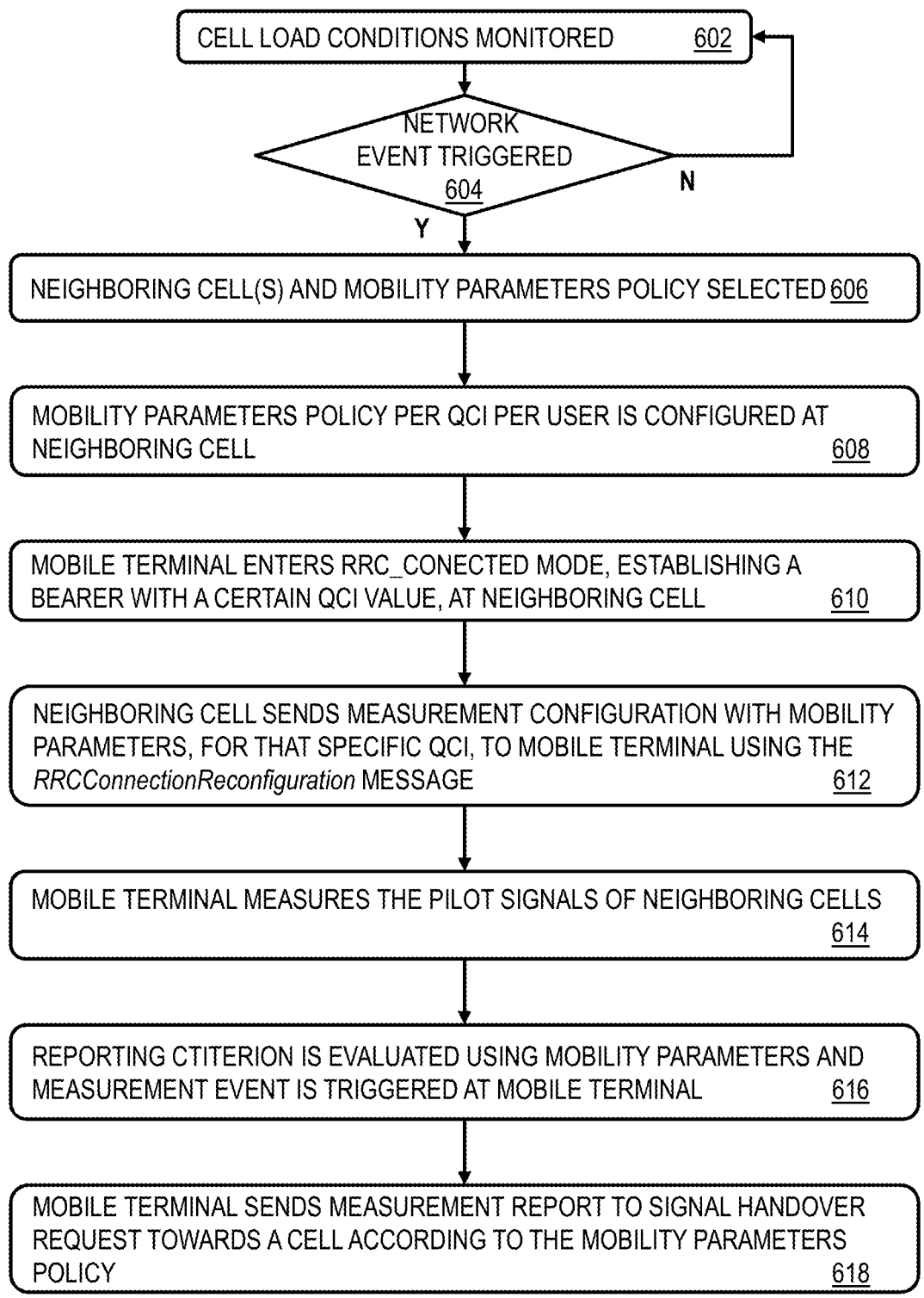
FIG. 6 depicts an illustrative embodiment of a process used in portions of the system described in FIGS. 1-2.

FIG. 6 depicts an illustrative embodiment of a process 600 used in portions of the system described in FIGS. 1-2. The process 600 includes monitoring cell load conditions at 602. To the extent a network event is not triggered at 604, the monitoring continues at 602. To the extent that a network event is triggered at 604, one or more neighboring cells are selected and mobility parameters policies are selected at 606. For example, the neighboring cells can be selected according to the ranking scenario of the process 500.

Once the neighboring cells have been selected, the mobility parameters are configured at each of the identified neighboring cells at 608. The mobility parameters policy can be determined per QCI, e.g., per service type, per user, e.g., per user status: economy, standard, priority or per a combination of service type and user status. For example, such user statuses can be determined based on a user subscription level. Thus, some users might opt to pay more for a subscription level that provides less restrictions to handovers, e.g., allowing handover of priority users despite excess loading or utilization of a target cell, while restricting handovers for users having a lesser subscription. In some embodiments such differentiations can be accomplished with multiple different threshold offsets that are applied according to the service and/or user status.

Mobile terminals that enter RRC_Connected mode at 610, establish a bearer at a serving neighboring cell having a certain CQI value. Bearers can include standard radio bearers and dedicated radio bearers as is generally understood in LTE and UMTS networks.

The serving neighboring cell sends measurement configuration with mobility parameters at 612. In particular, the measurement configuration and mobility parameters are particular for a specific QCI of the mobile terminal. The configuration and parameters can be sent to the mobile terminal by way of the RRCConnectionReconfiguration message.

The mobile terminal adopts the measurement configuration and mobility parameters and measures pilot signals of neighboring cells, including potential mobility target cells at 614. The mobile terminal evaluates the reporting criterion using the updated measurement configuration and mobility parameters at 616. The mobile terminal sends measurement report at 618 to signal a handover request towards a target neighboring cell according to the mobility parameters policy.

The measurement configuration is provided by eNodeB when a UE enters in RRC_CONNECTED mode by means of dedicated signaling, e.g., using the RRCConnectionReconfiguration message. (Note: UE's measurement information is in accordance with the measurement configuration as provided by eNodeB).

As per 3GPP TS 36.331 a measurement configuration consists of:
(i) measurement object—frequency layer where measurements shall be performed;
(ii) reporting criterion—criterion that triggers the UE to send a measurement report;
(iii) reporting format—quantities that the UE includes in the measurement report and number of cells; (iv) quantity configuration—the measurement quantity and associated filtering used for all event evaluation and related reporting; and
(v) measurement gaps—time periods that UE may use to perform measurements.

When the configuration of the reporting criterion is met, a measurement report is sent by the mobile terminal to eNB, signaling a request for handover towards a target neighboring cell. A reporting criterion contains a trigger condition which is assessed by the mobile terminal after it measures the pilot signal of the serving and/or neighboring cells and applies additional handover configuration parameters provided by the eNodeB.

3GPP Technical Specification 36.331, describes the trigger conditions to be used in order to initiate a measurement report to eNB. Three out of six trigger conditions are of particular importance because they can be used to indicate a handover to a target cell is required and at the same time allow a certain bias/offset to be applied, specifically: (i) when a neighboring Cell becomes better than threshold, or (ii) when a neighboring Cell becomes offset better than the Serving Cell, or (iii) when a serving Cell becomes worse than ThresholdX and Neighboring Cell becomes better than ThresholdY.

They consist of pilot signal measurements and handover specific configuration parameters, which are further defined in the inequality relations below.

Neighboring Cell becomes better than threshold:

$$\text{Meas}_{neigh}+\text{Offset}_{neigh,freq}|_{dB}+\text{Offset}_{neigh,cell}|_{dB}-\text{Hysteresis}|_{dB}>\text{Threshold} \quad (3)$$

Neighbor cell becomes better than the serving cell by an offset:

$$\text{Meas}_{neigh}+\text{Offset}_{neigh,freq}|_{dB}+\text{Offset}_{neigh,cell}|_{dB}-\text{Hysteresis}|_{dB}>\text{Meas}_{serv}+\text{Offset}_{serv,freq}|_{dB}+\text{Offset}_{serv,cell}|_{dB}+\text{Offset}|_{dB} \quad (4)$$

Serving Cell becomes worse than threshold1 and Neighboring Cell becomes better than threshold2:

$$\text{Meas}_{serv}+\text{Hysteresis}|_{dB}<\text{Threshold1} \quad (5)$$

AND $$\text{Meas}_{neigh}+\text{Offset}_{neigh,freq}|_{dB}+\text{Offset}_{neigh,cell}|_{dB}-\text{Hysteresis}|_{dB}>\text{Threshold2} \quad (6)$$

Where the variables in above formulas are defined as follows:

$\text{Meas}_{serv}$ is the pilot signal strength or pilot signal quality of the serving cell. In LTE it can be either RSRP (expressed in dBm), or RSRQ (expressed in dB).

$\text{Meas}_{neigh}$ is the pilot signal strength or pilot signal quality of the neighboring cell. In LTE it can be either RSRP (expressed in dBm), or RSRQ (expressed in dB).

$\text{Offset}_{neigh,freq}$ is the frequency specific offset of the frequency of the neighbor cell expressed in dB.

$\text{Offset}_{serv,freq}$ is the frequency specific offset of the frequency of the serving cell expressed in dB.

$\text{Offset}_{neigh,cell}$ is the cell specific offset of the neighbor cell expressed in dB.

$\text{Offset}_{serv,cell}$ is the cell specific offset of the serving cell expressed in dB.

Offset is an offset value expressed in dB.

Hysteresis is the hysteresis parameter expressed in dB.

Threshold, ThresholdX, ThresholdY are the threshold parameters expressed in dBm in case of RSRP, or in dB in case of RSRQ.

Except the measurement results $\text{Meas}_{serv}$ and $\text{Meas}_{neigh}$, the rest of the terms in inequalities (3), (4), (5) and (6) are handover configuration parameters sent to the mobile terminal, when it enters in RRC_CONNECTED mode and apply to: (i) all reporting criteria: e.g., Hysteresis; (ii) the trigger event itself, e.g., Threshold, Threshold1, Threshold2; (iii) each frequency relation, e.g., $\text{Offset}_{neigh,freq}$; and (iv) each neighbor relation, e.g., $\text{Offset}_{neigh,cell}$.

Table 4 below summarizes the tunable parameters per 3GPP trigger event described in TS 36.331.

TABLE 4

Tunable parameters for intra-LTE and IRAT Handover

| ID | Trigger condition | Tunable Parameters |
|---|---|---|
| A4, B1 | Neighboring Cell becomes better than threshold | $\text{Offset}_{neigh, freq}$, $\text{Offset}_{neigh, cell}$, Hysteresis, Threshold |
| A3 | Neighboring Cell becomes offset better than the Serving Cell | $\text{Offset}_{neigh, freq}$, $\text{Offset}_{neigh, cell}$, Hysteresis, Off |

TABLE 4-continued

Tunable parameters for intra-LTE and IRAT Handover

| ID | Trigger condition | Tunable Parameters |
|---|---|---|
| A5, B2 | Serving Cell becomes worse than Threshold1 and Neighboring Cell becomes better than Threshold2 | $Offset_{neigh,\ freq}$, $Offset_{neigh,\ cell}$, Hysteresis, Threshold1, Threshold2 |

The currently available handover mechanisms in 3GPP do not include service related and/or cell load related handover parameters. Accordingly, the currently available techniques making it impossible to control mobility for specific services by taking into account the load conditions in a cell.

Because of the above limitations, network engineers have no means to prevent incoming handovers for specific services in a cell that is experiencing a surge in traffic load, in order to keep the cell load within acceptable limits.

Without a Dynamic Network Configuration framework and a Service and Load coordinated mobility traffic flow adaptation in place, different mobile terminals with different services shall evaluate the same way a given handover trigger condition. Hence, all terminals and services shall move alike from one cell to another and without taking into consideration the load conditions in the target cell.

While for purposes of simplicity of explanation, the respective processes are shown and described as a series of blocks in FIGS. 3-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
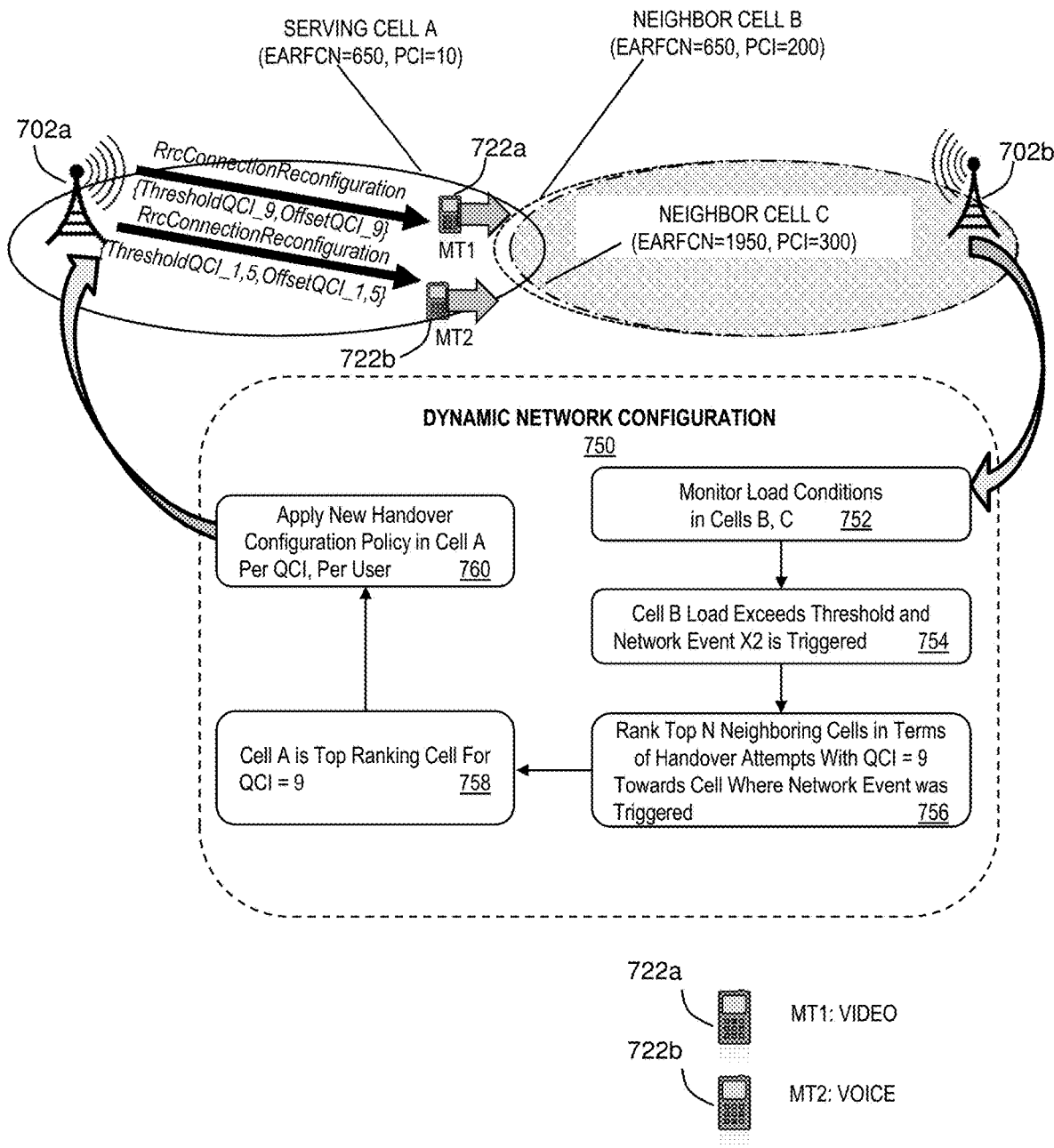
FIG. 7 depicts an illustrative embodiment of a portion of a mobile cellular network including an example application of a dynamic network configuration function.

FIG. 7 depicts an illustrative embodiment of a portion of a mobile cellular network 700 including an example application of a dynamic network configuration function. The network 700 includes a first eNB 702a providing a serving cell, Cell_A in a first sector, and a second eNB 702b providing two neighboring cells, Cell_B and Cell_C in a second sector. Two mobile terminals 722a, 722b (generally 722) being served by Cell_A, are moving away from the first sector of the first eNB 702a towards the second sector of the second eNB 702b.

The network 700 also includes a DNC controller, 750 in communication with the first and second eNBs 702a, 702b (generally 702). In the illustrative example, the DNC controller 750 includes a cell load monitoring module 752, a trigger module 754, neighbor cell selection modules 756, 758 and a policy application module 760. The cell load monitoring module 752 receives cell load conditions in Cell_B and Cell_C.

The trigger module 754 indicates a triggered event in response to cell load at Cell_B exceeding a trigger threshold. Event X2 is triggered (see, e.g., Table 2 above). The neighbor cell selection modules 756 receive an indication of an occurrence of the trigger event X2. In response, the neighbor cell selection module 756 ranks the top N neighboring cells in terms of handover attempts with QCI=9, towards Cell_B, where the network event X2 was triggered. In the illustrative example, Cell_A is identified as the top ranking cell for QCI=9. A new handover configuration policy ConfigPOL_1 is identified, according to the rules of Table 2.

An example of a mobility configuration policy 800 for reporting criterion for trigger conditions for QCI=1, 5 and 9 is provided below in the table of FIG. 8A.

The information identifying the occurrence of the trigger event can include an indication of an associated trigger. The policy selection module 254, in turn, selects a policy from a number of available policies, responsive to the detection of the triggered event. The particular policy selected can be based on one or more values, such as the type of trigger, the type of triggered event, the cell(s) related to the triggered event, and a currently configuration policy in place at the time of the triggered event.

The policy application module 256 is in communication with the policy selection module 254 and receives the selected policy, an indication of the selected policy, and/or corresponding configuration parameter(s) and/or associated parameter value(s). The selected policy and/or configuration parameter(s)/value(s) are provided to one or more cells that neighbor the cell associated with the trigger event. In the illustrative example, a trigger event resulting from monitor information that indicates a high and/or rapidly increasing load condition at Cell_B, results in selection of a policy having one or more configuration parameter(s) and/or associated value(s). The configuration parameter(s) and/or associated values are provided to the first eNB 202a based on its association with Cell_A as a neighboring cell to Cell_B.

Figures 8A, 8B:
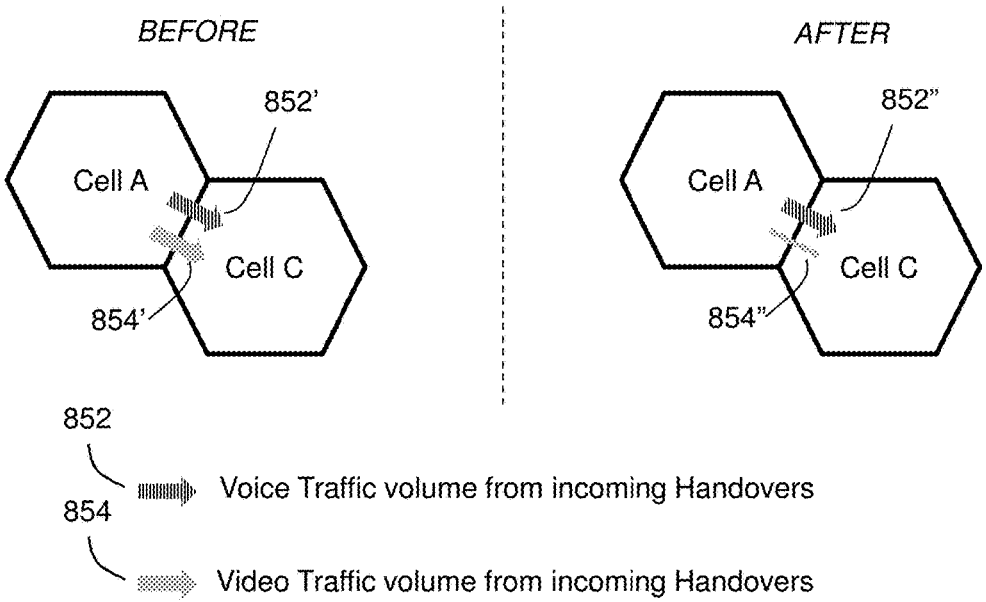
FIG. 8A depicts an illustrative embodiment of a mobility configuration policy for reporting criterion for triggered condition.
FIG. 8B depicts an illustrative embodiment of an application of a process of FIGS. 3, 4, 5, 6 and/or 7 used in portions of the system described in FIGS. 1-2.

FIG. 8B depicts an illustrative embodiment of an application of a process of FIGS. 3, 4, 5, 6 and/or 7 used in portions of the system described in FIGS. 1-2. Neighboring cells, Cell_A and Cell_C are shown in a before and after configuration, in which the before and after refer to implementation of a configuration policy change by the dynamic network configuration controller. In a before configuration, a first arrow 852' signifies a quantity of voice traffic volume due to incoming handovers, e.g., handovers from Cell_A to Cell_C. A second arrow 854' signifies a quantity of video traffic volume due to incoming handovers.

The size of the arrows 852', 854' in the before configuration are approximately the same; whereas, the size of the arrows 852", 854" in the after configuration are different. Namely, the quantity of voice traffic volume from incoming handovers of voice traffic remains largely unchanged before 852' and after 852"; whereas the size of the arrows 854', 854" are substantially different. Namely, the quantity of video traffic volume from the incoming handovers of video traffic is reduced substantially.

FIG. 9 depicts an illustrative embodiment of a first communication system 900 for delivering media content. The communication system 900 can represent an Internet Protocol Television (IPTV) media system. Communication system 900 can be overlaid or operably coupled with reference to the mobile cellular network 100-200 of FIGS. 1 and/or 2 as another representative embodiment of communication system 900. For instance, one or more devices illustrated in the communication system 900 of FIG. 9 can determine a demand for real-time services to a first UE 122 (FIG. 1), by way of an eNB 102a of an LTE system 100. A triggering event is detected based on a monitoring of utilization of a target cell within a cellular network system. A configuration policy including a handover configuration parameter is determined, responsive to the triggering event. A source cell of a plurality of neighboring cells of the target cell is identified and a handover procedure of a user equipment from the source cell to the target cell is configured based on the handover configuration parameter. The source cell provides the handover configuration parameter to the user equipment connected to the source cell. The user equipment performs handover measurements from the source cell to the target cell based on the handover configuration parameter, and a handover of the user equipment from the source cell to the target cell is based on the handover measurements.

The IPTV media system can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a hardware conservation controller (herein referred to as controller 930). The controller 930 can use computing and communication technology to perform function 962, which can include among other things, the hardware consolidating techniques described by processes 300, 400, 500 and/or 600 of FIGS. 3-6. For instance, function 962 of the controller 930 can be similar to the functions described for the controller 130 of FIG. 1 in accordance with the processes 400 and/or 500. The wireless communication devices 916 can be provisioned with software function 966, to utilize the services of the controller 930. For instance, functions 966 of the wireless communication devices 916 can be similar to the functions described for the communication devices 122 of FIG. 1 in accordance with the processes 300, 400, 500 and/or 600 of FIGS. 3-6.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
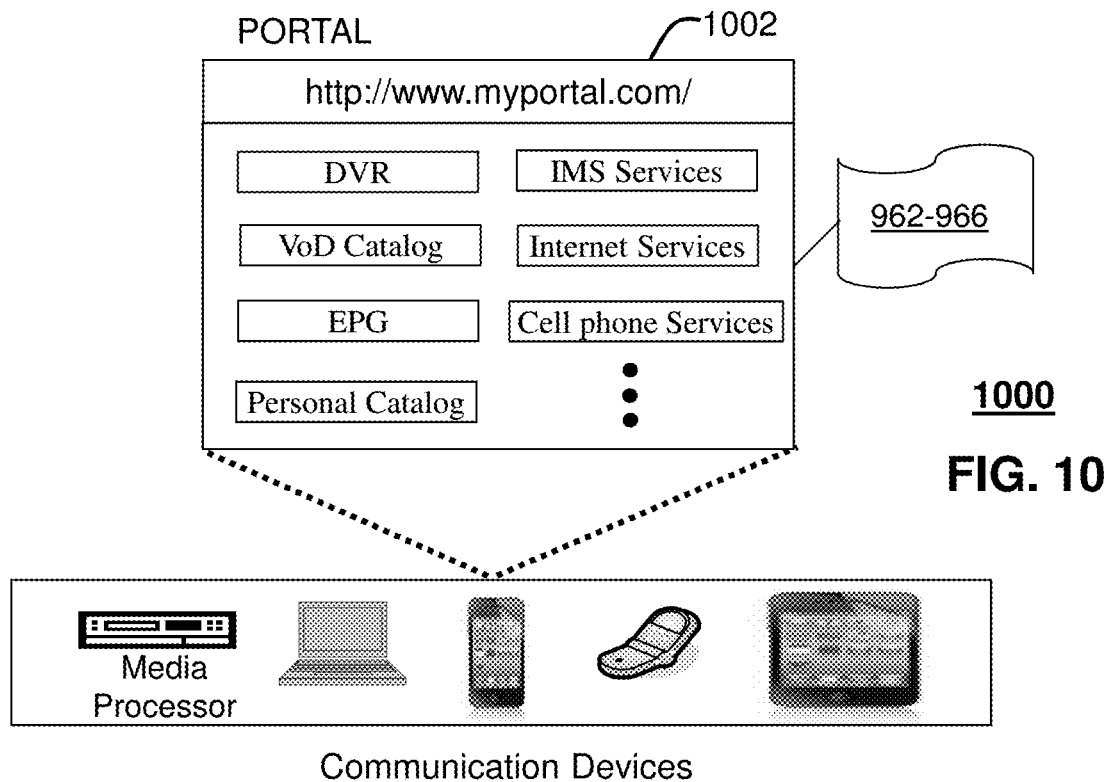
FIG. 10 depicts an illustrative embodiment of a web portal for interacting with the communication systems of FIGS. 1-2, and 9.

FIG. 10 depicts an illustrative embodiment of a web portal 1002 of a communication system 1000. The communication system 1000 can be overlaid or operably coupled with systems 100, 200 of FIGS. 1 and/or 2, communication system 900 as another representative embodiment of systems 100, 200 of FIGS. 1 and/or 2. The web portal 1002 can be used for managing services of systems 100, 200 of FIGS. 1 and/or 2 and communication system 900. A web page of the web portal 1002 can be accessed by a Uniform Resource Locator (URL) with an Internet browser using an Internet-capable communication device such as those described in FIGS. 1 and/or 2 and FIG. 9. The web portal 1002 can be configured, for example, to access a media processor 906, e.g., including a media processor of a mobile device 916, and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906 and/or mobile device 916. The web portal 1002 can also be used for provisioning IMS services described earlier, provisioning Internet services, provisioning cellular phone services, and so on.

The web portal 1002 can further be utilized to manage and provision software applications 962-966, to adapt these applications as may be desired by subscribers and/or service providers of systems 100, 200 of FIGS. 1 and/or 2, and communication systems 900. For instance, users of the services provided by a network accessible server, such as server 930 can log into their on-line accounts and provision the servers 930 with programmable features, such as user profiles, provide contact information to the server to enable it to communication with devices described in FIGS. 1-2 and/or 9, and so on. Service providers can log onto an administrator account to provision, monitor and/or maintain the systems 100, 200 of FIGS. 1 and/or 2, or server 930 of FIG. 9.

Figure 11:
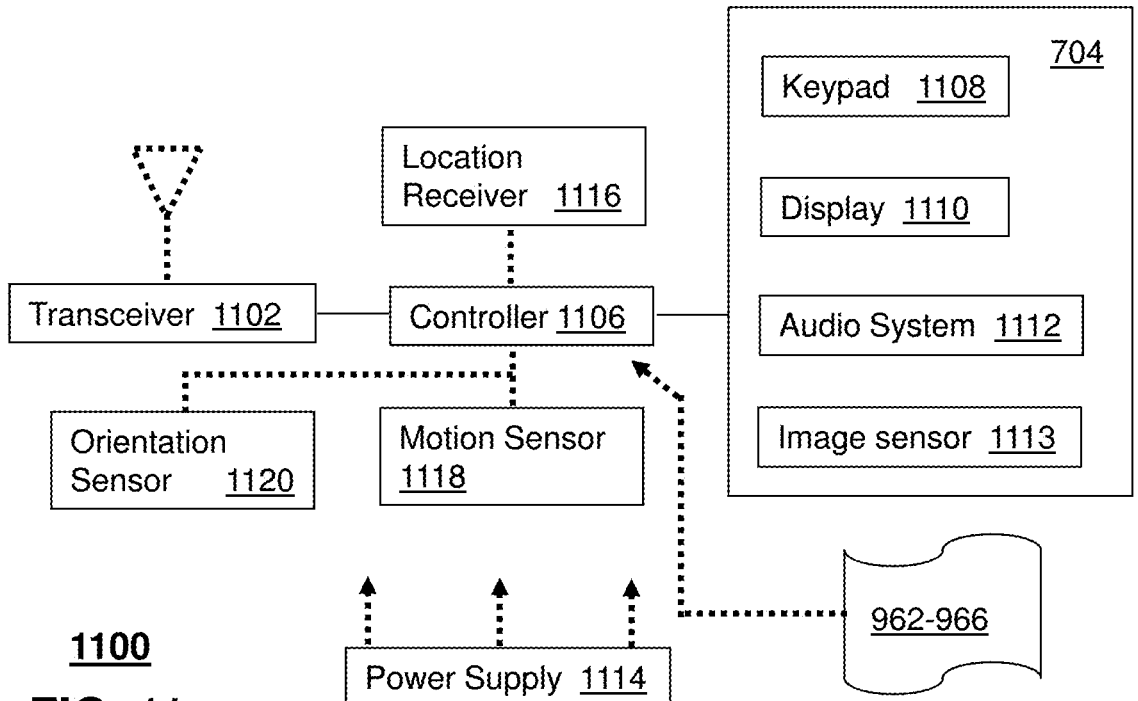
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1 and/or 2, and FIGS. 7 and/or 9 and can be configured to perform portions of one or more of the processes 300-600 of FIGS. 3-6.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1 and/or 2, the media processor 906, the media devices 908, or the portable communication devices 916 of FIG. 9. It will be appreciated that the communication device 1100 can also represent other devices that can operate in systems of FIGS. 1 and/or 2, communication systems 700, 900 of FIGS. 7 and/or 9 such as a gaming console and a media player. In addition, the controller 1106 can be adapted in various embodiments to perform the functions 962-966, respectively.

Upon reviewing the aforementioned embodiments, it would be evident to an artisan with ordinary skill in the art that said embodiments can be modified, reduced, or enhanced without departing from the scope of the claims described below. For example, the techniques can be applied to handovers between cell sites, and overlapping neighboring cells, such as small cells, micro cells, pico cells, femto cells, and the like. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
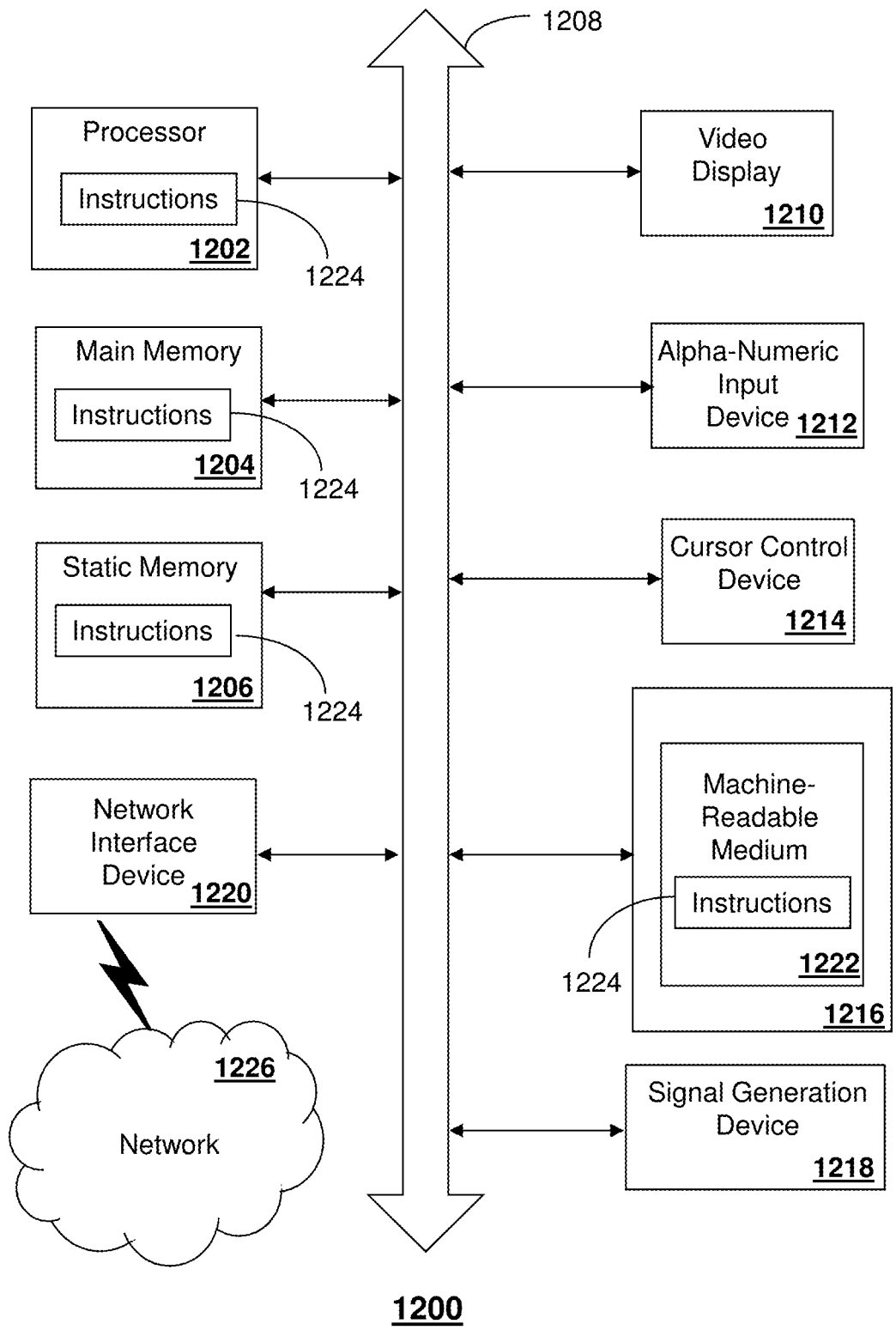
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the dynamic network configuration controller 130, 230, 750, the eNB 202, 702, the MME 114, the S-GW 116, the P-GW 118 and the cell-utilization detector 251. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

As disclosed herein, the radio equipment can include, without limitation, one or more radio frequency circuits, software firmware modules, field-programmable gate arrays, application software, software of a physical layer, software of a data link layer, software of a logical link control layer, and software of a media access control layer, configured or otherwise adapted to implement one or more radio functions. Examples include traditional radios, software defined radios and combinations thereof.

A radio device, radio equipment and/or radio functions, according to various embodiments, can include a device and/or function that uses radio spectrum to transmit and/or receive information. According to various embodiments, a radio device may be a wireless device. According to various embodiments, a radio device may be a mobile device. For example, a radio device may be a device configured for wireless communication. In various embodiments, a radio device may be a mobile radio communication device, and a mobile radio communication device may be an end-user mobile device. In various embodiments, a mobile radio communication device may be any kind of mobile telephone, personal digital assistant, mobile computer, or any other mobile device configured for communication with a mobile communication base station, e.g., a base station or an access point, and may be also referred to as a User Equipment (UE), a mobile station or an advanced mobile station. According to various embodiments, a radio device, equipment and/or function can include a base station, a NodeB, including an evolved-NodeB (eNB), a home base station, a home NodeB, a pager, a radio receiving apparatus, a walkie-talkie, an interference transmitter, a jammer transmitter, a remote control, a television station or a radio station. According to various embodiments, a radio device, equipment and/or software can be configured according to one or more of the wireless, radio access and/or networking technologies disclosed herein.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    monitoring, by a processing system including a processor, a utilization of a target cell of a cellular network system;
    analyzing, by the processing system, the utilization of the target cell to obtain an analysis result;
    determining, by the processing system, a predictive trend based on the analysis result;
    detecting, by the processing system, a triggering event based on the monitoring of the utilization;
    determining, by the processing system, responsive to the triggering event, a configuration policy comprising a handover configuration parameter according to a service utilized by user equipment via a source cell of the cellular network system and according to the predictive trend, wherein the handover configuration parameter is further determined according to a subscription level associated with the user equipment, wherein the handover configuration parameter further comprises a handover configuration parameter set including an individual cell offset value, and wherein the individual cell offset value is based on the subscription level; and
    providing, by the processing system, the handover configuration parameter to the source cell, a handover of the user equipment from the source cell to the target cell being managed according to the service by way of handover measurements based on the handover configuration parameter.

2. The method of claim 1, wherein the monitoring of the utilization further comprises monitoring, by the processing system, one of an S1 transport utilization, an uplink rise over thermal noise, or a combination thereof.

3. The method of claim 1, wherein the monitoring of the utilization further comprises monitoring, by the processing system, one of a physical resource block utilization, a cell throughput, a hardware utilization, or a combination thereof.

4. The method of claim 1, further comprising:
    determining, by the processing system, a number of handover requests for each of a plurality of neighboring cells according to a plurality of services comprising the service utilized by the user equipment;
    ranking, by the processing system, the plurality of neighboring cells based on a number of handover requests; and
    identifying, by the processing system, the source cell based on the ranking.

5. The method of claim 1, wherein the handover further comprises an intra-frequency-intra-radio access technology handover, an inter-frequency/intra-radio access technology handover, or an inter-frequency/inter-radio access technology handover.

6. The method of claim 1, wherein the source cell selectively provides the handover configuration parameter to the user equipment connected to the source cell based on a user of the user equipment or the service of the user equipment.

7. The method of claim 6, wherein the service of the user equipment is identified by a quality control indicator.

8. A device, comprising:
    a processing system including a processor; and
    a memory that stores executable instructions that, when executed by the processing system, facilitates performance of operations, the operations comprising:
        detecting a triggering event based on a monitoring of a utilization of a target cell within a cellular network system;
        analyzing the utilization of the target cell to obtain an analysis result;
        determining a predictive trend based on the analysis result;
        determining a configuration policy responsive to the triggering event, wherein the configuration policy comprises a handover configuration parameter according to a service utilized by user equipment via a source cell of the cellular network system and according to the predictive trend, wherein the handover configuration parameter is further determined according to a subscription level associated with the user equipment, wherein the handover configuration parameter further comprises a handover configuration parameter set including an individual cell offset value, and wherein the individual cell offset value is based on the subscription level; and
        providing the handover configuration parameter to the source cell, a handover of the user equipment from the source cell to the target cell being managed according to the service by way of handover measurements based on the handover configuration parameters.

9. The device of claim 8, wherein the monitoring of the utilization further comprises monitoring one of an S1 transport utilization, an uplink rise over thermal noise, or a combination thereof.

10. The device of claim 8, wherein the monitoring of the utilization further comprises monitoring one of a physical resource block utilization, a cell throughput, a hardware utilization, or a combination thereof.

11. The device of claim 8, wherein the operations further comprise:
   determining a number of handover requests for each of a plurality of neighboring cells according to a plurality of services comprising the service utilized by the user equipment;
   ranking the plurality of neighboring cells based on a predetermined number of handover requests; and
   identifying the source cell based on the ranking.

12. The device of claim 8, wherein the handover further comprises an intra-frequency-intra-radio access technology handover, an inter-frequency/intra-radio access technology handover, or an inter-frequency/inter-radio access technology handover, and wherein the processing system further comprises a plurality of processors operating in a distributed processing environment.

13. The device of claim 8, wherein the source cell selectively provides the handover configuration parameter to the user equipment connected to the source cell based on one of a user of the user equipment or the service utilized by the user equipment.

14. The device of claim 13, wherein the service of the user equipment is identified by a quality control indicator.

15. A non-transitory, machine-readable medium, comprising executable instructions that, when executed by a processing system including a processor, facilitate performance of operations, the operations comprising:
   detecting a triggering event based on a monitoring of a utilization of a target cell within a cellular network system;
   analyzing the utilization of the target cell to obtain an analysis result;
   determining a predictive trend based on the analysis result;
   determining a configuration policy, responsive to the triggering event, wherein the configuration policy comprises a handover configuration parameter according to a service utilized by user equipment via a source cell of the cellular network system and according to the predictive trend, wherein the handover configuration parameter is further determined according to a subscription level associated with the user equipment, wherein the handover configuration parameter further comprises a handover configuration parameter set including an individual cell offset value, and wherein the individual cell offset value is based on the subscription level; and
   providing the handover configuration parameter to the source cell, a handover of the user equipment from the source cell to the target cell being managed according to the service by way of handover measurements based on the handover configuration parameter.

16. The non-transitory, machine-readable medium of claim 15, wherein the monitoring of the utilization further comprises monitoring one of an S1 transport utilization, an uplink rise over thermal noise, or a combination thereof.

17. The non-transitory, machine-readable medium of claim 15, wherein the monitoring of the utilization further comprises monitoring one of a physical resource block utilization, a cell throughput, a hardware utilization, or a combination thereof.

18. The non-transitory, machine-readable medium of claim 15, wherein the operations further comprise:
   determining a number of handover requests for each of a plurality of neighboring cells according to a plurality of services comprising the service utilized by the user equipment;
   ranking the plurality of neighboring cells based on a predetermined number of handover requests; and
   identifying the source cell based on the ranking.

19. The non-transitory, machine-readable medium of claim 15, wherein the handover further comprises an intra-frequency-intra-radio access technology handover, an inter-frequency/intra-radio access technology handover, or an inter-frequency/inter-radio access technology handover.

20. The non-transitory, machine-readable medium of claim 15, wherein the source cell selectively provides the handover configuration parameter to the user equipment connected to the source cell based on one of the user of the user equipment or the service utilized by the user equipment, and wherein the processing system comprises a plurality of processors operating in a distributed processing environment.

* * * * *